United States Patent
Hisada et al.

(10) Patent No.: US 7,565,938 B2
(45) Date of Patent: Jul. 28, 2009

(54) ELECTRICALLY OPERATED VEHICLE DRIVE CONTROLLER AND ELECTRICALLY OPERATED VEHICLE DRIVE CONTROL METHOD

(75) Inventors: Hideki Hisada, Aichi-ken (JP); Takeshi Hara, Aichi-ken (JP); Masaki Nomura, Aichi-ken (JP)

(73) Assignee: Aisin AW Co., Ltd., Aichi-ken (JP)

( * ) Notice: Subject to any disclaimer, the term of this patent is extended or adjusted under 35 U.S.C. 154(b) by 703 days.

(21) Appl. No.: 11/127,195

(22) Filed: May 12, 2005

(65) Prior Publication Data

US 2005/0283283 A1 Dec. 22, 2005

(30) Foreign Application Priority Data

Jun. 18, 2004 (JP) ............... 2004-181758

(51) Int. Cl.
*B60K 1/02* (2006.01)
(52) U.S. Cl. ................... 180/65.1; 180/65.235
(58) Field of Classification Search ......... 180/65.1, 180/65.2, 65.3, 65.4, 65.235, 65.265
See application file for complete search history.

(56) References Cited

U.S. PATENT DOCUMENTS

| | | | |
|---|---|---|---|
| 3,720,863 A * | 3/1973 | Ringland et al. ......... 318/52 |
| 5,788,006 A | 8/1998 | Yamaguchi | |
| 5,823,281 A | 10/1998 | Yamaguchi et al. | |
| 5,865,263 A * | 2/1999 | Yamaguchi et al. ........ 180/65.2 |
| 5,899,286 A * | 5/1999 | Yamaguchi .............. 180/65.3 |
| 5,973,463 A * | 10/1999 | Okuda et al. ............. 318/430 |
| 6,161,068 A * | 12/2000 | Kurishige et al. ........... 701/41 |
| 6,479,906 B2 * | 11/2002 | Uchida ................. 290/40 C |
| 6,722,457 B2 * | 4/2004 | Yamaguchi et al. ... 180/65.235 |
| 6,902,018 B2 * | 6/2005 | Hisada et al. ............ 180/65.1 |
| 7,353,094 B2 * | 4/2008 | Okoshi et al. .............. 701/22 |
| 2001/0034572 A1 | 10/2001 | Yamaguchi et al. | |

FOREIGN PATENT DOCUMENTS

| | | |
|---|---|---|
| JP | 64-60286 A | 3/1989 |
| JP | 8 295 140 | 11/1996 |
| JP | 2001-1773 A | 1/2001 |
| JP | 2003-018706 A | 1/2003 |

* cited by examiner

*Primary Examiner*—Christopher P Ellis
*Assistant Examiner*—Bridget Avery
(74) *Attorney, Agent, or Firm*—Sughrue Mion, PLLC

(57) ABSTRACT

An electrically operated vehicle drive controller has an electric generator target torque calculation processing means for calculating electric generator target torque TG*; an inertia correction torque calculation processing means for calculating inertia correction torque on the basis of inertia torque TGI of an electric generator; a drive motor target torque generation processing means for generating drive motor target torque on the basis of the calculated inertia correction torque; and a damping torque correction processing means for correcting output torque on the basis of an output torque changing index which expresses a change of output torque due to the inertia correction torque.

11 Claims, 12 Drawing Sheets

ELECTRICALLY OPERATED VEHICLE DRIVE CONTROLLER AND ELECTRICALLY OPERATED VEHICLE DRIVE CONTROL METHOD

This application claims priority to Japanese Patent Application JP 2004-181758, filed in the Japanese Patent Office on Jun. 18, 2004, the disclosure of which is incorporated herein by reference.

BACKGROUND OF THE INVENTION

1. Field of the Invention

The present invention relates to an electrically operated vehicle drive controller and an electrically operated vehicle drive control method.

2. Background Art

A planetary gear unit having a sun gear, a ring gear and a carrier is conventionally arranged in a vehicle drive unit mounted to a hybrid vehicle as an electrically operated vehicle and transmitting one portion of engine torque (as torque of an engine) to an electric generator (electric generator motor) and transmitting the remaining engine torque to a drive wheel. The sun gear and the electric generator are connected to each other. The ring gear, a drive motor and the drive wheel are connected to each other. The carrier and the engine are connected to each other. Driving force is generated by transmitting rotation outputted from the ring gear and the drive motor to the drive wheel.

In the vehicle drive unit, the electrically operated vehicle drive controller is arranged to adjust the engine torque transmitted to the drive wheel. This electrically operated vehicle drive controller calculates inertia correcting torque by subtracting inertia torque (as torque of an inertia amount of the electric generator) from electric generator target torque which is a target value of electric generator torque (as torque of the electric generator). The electrically operated vehicle drive controller presumes drive shaft torque constituting torque outputted from a drive shaft as output torque on the basis of this inertia correcting torque. With respect to vehicle request torque required to run the hybrid vehicle, excessive and deficient amounts of the output torque are compensated for by driving the drive motor (see e.g., JP-A-8-295140).

However, in the conventional electrically operated vehicle drive controller, for example, angular acceleration of the electric generator is required to calculate the inertia torque. However, this angular acceleration is influenced by a detecting error, etc. of a position sensor for detecting a rotor position and is changed. Accordingly, the angular acceleration includes a disturbance component of a noise shape so that the inertia torque also includes the disturbance component of the noise shape. Hence, vibration is generated in the hybrid vehicle when the drive motor is driven by drive motor target torque which is a target value of drive motor torque (as torque of the drive motor) calculated on the basis of the inertia torque.

Therefore, it is considered that, in order to restrain the disturbance component of the noise shape from being included in the angular acceleration, the angular acceleration is presumed by using a filter in calculating the angular acceleration or a means of state presumption, etc. However, when the filter is used in calculating the angular acceleration, the disturbance component of the noise shape can be removed, but delay is caused in the calculation of the angular acceleration and vibration can not be restrained. Further, there is a case in which the vibration is increased. In contrast to this, when the angular acceleration is presumed by the means of the state presumption, etc., an error is caused between the presumed angular acceleration and the actual angular acceleration by a mechanical difference between a model used in the state presumption and the actual vehicle drive unit so that the vibration is generated.

SUMMARY OF THE INVENTION

An object of the invention is to solve the problems of the conventional electrically operated vehicle drive controller, and provide an electrically operated vehicle drive controller and an electrically operated vehicle drive control method able to reliably compensate for the excessive and deficient amounts of the output torque with respect to the vehicle request torque by driving the drive motor, and restrain the generation of the vibration in the vehicle drive unit.

Therefore, an electrically operated vehicle drive controller of the invention includes: electric generator target torque calculation processing means for calculating electric generator target torque showing a target value of electric generator torque; inertia correction torque calculation processing means for calculating inertia correction torque on the basis of the electric generator target torque or the electric generator torque corresponding to this electric generator target torque, and inertia torque of the electric generator; drive motor target torque generation processing means for generating drive motor target torque showing a target value of drive motor torque on the basis of the calculated inertia correction torque; and damping torque correction processing means for correcting output torque on the basis of an output torque changing index showing a change of output torque due to the inertia correction torque.

In another electrically operated vehicle drive controller of the invention, the inertia torque may be calculated on the basis of the angular acceleration and inertia of the electric generator.

In still another electrically operated vehicle drive controller of the invention, the output torque changing index may be the angular acceleration of the drive motor.

In still another electrically operated vehicle drive controller of the invention, the damping torque correction processing means may calculate damping torque on the basis of the output torque changing index and a predetermined correction coefficient, and may correct the output torque on the basis of this damping torque.

In still another electrically operated vehicle drive controller of the invention, the damping torque correction processing means may correct the drive motor target torque on the basis of the damping torque.

In still another electrically operand vehicle drive controller of the invention, the correction coefficient may be a damping coefficient set in advance.

In still another electrically operated vehicle drive controller of the invention, the correction coefficient may be the inertia of the drive motor.

In still another electrically operated vehicle drive controller of the invention, the damping torque correction processing means may correct the output torque so as to set the angular acceleration of the drive motor to zero.

In still another electrically operated vehicle drive controller of the invention, the inertia correction processing means may calculate inertia correction torque by multiplying the angular acceleration of the electric generator by the inertia, and the damping torque correction processing means may calculate damping torque by multiplying the angular acceleration of the drive motor by the inertia.

In still another electrically operated vehicle drive controller of the invention, a calculation value of the inertia torque of the electric generator may be subtracted from a calculation value of the damping torque, and the torque may then be limited by a limiter.

In still another electrically operated vehicle drive controller of the invention, the electrically operated vehicle drive controller may include a differential rotating device having first to third differential elements.

The first differential element is mechanically connected to the electric generator, and the second differential element is mechanically connected to the drive motor mechanically connected to a drive wheel, and the third differential element is mechanically connected to an engine. The rotating speed of the electric generator is controlled in the electric generator so as to set engine torque to engine target torque. The drive motor torque is controlled in the drive motor so as to set drive shaft torque outputted to a drive shaft to vehicle request torque required to run the electrically operated vehicle.

In still another electrically operated vehicle drive controller of the invention, the drive motor target torque may be calculated by adding the damping torque to a calculation value calculated by subtracting the inertia correction torque from the vehicle request torque.

In an electrically operated vehicle drive control method of the invention, electric generator target torque showing a target value of electric generator torque is calculated, and inertia correction torque is calculated on the basis of the electric generator target torque, or the electric generator torque corresponding to this electric generator target torque, and inertia torque of the electric generator, and drive motor target torque showing a target value of drive motor torque is generated on the basis of the calculated inertia correction torque, and output torque is corrected on the basis of an output torque changing index showing a change of the output torque due to the inertia correction torque.

In accordance with the invention, the electrically operated vehicle drive controller includes: the electric generator target torque calculation processing means for calculating electric generator target torque showing a target value of electric generator torque; the inertia correction torque calculation processing means for calculating inertia correction torque on the basis of the electric generator target torque or the electric generator torque corresponding to this electric generator target torque, and inertia torque of the electric generator; the drive motor target torque generation processing means for generating drive motor target torque showing a target value of drive motor torque on the basis of the calculated inertia correction torque; and the damping torque correction processing means for correcting output torque on the basis of an output torque changing index showing a change of output torque due to the inertia correction torque.

In this case, when the drive motor target torque is generated on the basis of the inertia correction torque and the drive motor is driven and vibration is generated in the electrically operated vehicle, the damping torque is generated and the output torque is corrected. Accordingly, it is possible to reliably compensate for the excessive and deficient amounts of the output torque with respect to the vehicle request torque, and restrain the generation of vibration in a vehicle drive unit.

BRIEF DESCRIPTION OF THE DRAWINGS

These and other features, aspects, and advantages of the present invention will become better understood with reference to the following description and accompanying drawings, which should not be read to limit the invention in any way, in which.

DETAILED DESCRIPTION OF THE INVENTION

The embodiments of the invention will next be explained in detail with reference to the drawings. In this case, a hybrid vehicle as an electrically operated vehicle will be explained.

Figure 2:
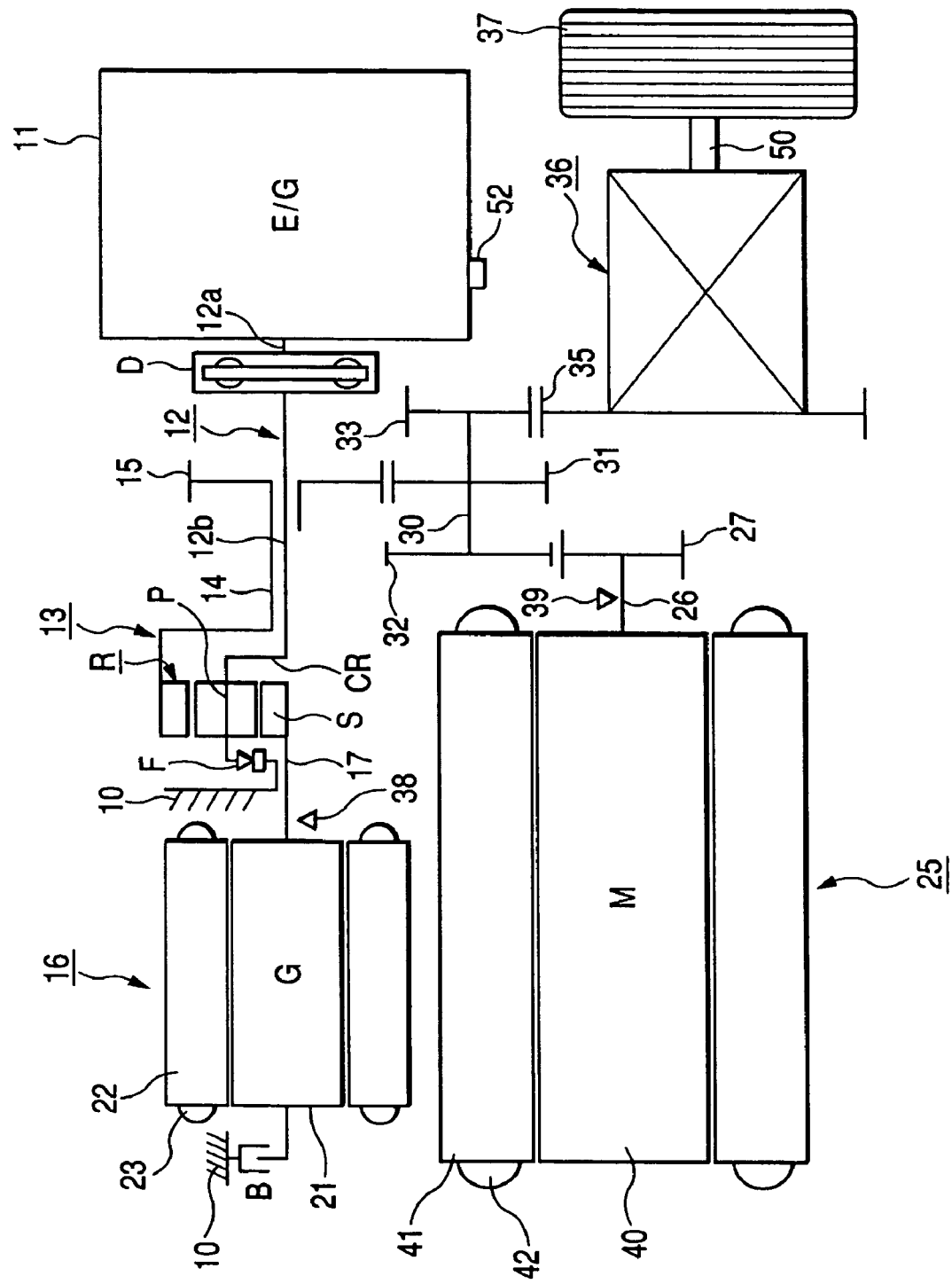
FIG. 2 is a conceptual view of a hybrid vehicle of the first embodiment of the invention.

FIG. 2 is a conceptual view of the hybrid vehicle of a first embodiment of the invention.

In this figure, reference numerals 11 and 12 respectively designate an engine (E/G) (as a driving source) arranged on a first axis and an output shaft, arranged on the first axis, which outputs rotation generated by driving the engine 11. Reference numeral 13 designates a planetary gear unit (as a differential rotating device), arranged on the first axis, which changes speeds with respect to the rotation inputted through the output shaft 12. Reference numeral 14 designates an output shaft arranged on the first axis, and the rotation after the speed change in the planetary gear unit 13 is outputted to the output shaft 14. Reference numeral 15 designates a first counter drive gear (as an output gear) fixed to the output shaft 14. Reference numeral 16 designates an electric generator (G) (as a driving source) and a first electrically operated machine, arranged on the first axis, which connects to the planetary gear unit 13 through a transmission shaft 17 and mechanically connects to the engine 11 so as to be differentially freely rotated. This electric generator 16 is mechanically connected to a drive wheel 37 (as a vehicle wheel).

A damper device D is arranged on the output shaft 12 and is connected between an input section 12a, on the engine 11 side of the output shaft 12, and an output section 12b, on the planetary gear unit 13 side. The damper device D has an unillustrated drive member attached to the input section 12a, an unillustrated driven member attached to the output section 12b, and an unillustrated spring (as a biasing member) arranged between the drive member and the driven member. Engine torque TE (as torque of the engine 11), transmitted to the drive member through the input section 12a, is transmitted to the spring, and a sudden torque change is absorbed by the spring. Thereafter, the engine torque TE is transmitted to the driven member and is outputted to the output section 12b.

The output shaft 14 has a sleeve shape and is arranged so as to surround the output shaft 12. Further, the first counter drive gear 15 is arranged on the engine 11 side from the planetary gear unit 13.

The planetary gear unit 13 has at least a sun gear S (as a first differential element), a pinion P engaged with the sun gear S, a ring gear R (as a second differential element), engaged with the pinion P, and a carrier CR (as a third differential element), for rotatably supporting the pinion P. The sun gear S is connected to the electric generator 16 through the transmission shaft 17. The ring gear R is arranged on a second axis, parallel to the first axis, through the output shaft 14 and a predetermined gear series, and is connected to a drive motor (M) 25 and a drive wheel 37 (as a driving source) and a second electrically operated machine mechanically connected to the engine 11 and the electric generator 16, so as to be differentially freely rotated. The carrier CR is connected to the engine 11 through the output shaft 12. The drive motor 25 is mechanically connected to the drive wheel 37. Further, a one-way clutch F is arranged between the carrier CR and a case 10 of a vehicle drive unit. The one-way clutch F becomes free when the rotation of the positive direction is transmitted from the engine 11 to the carrier CR. When the rotation of the reverse direction is transmitted from the electric generator 16 or the drive motor 25 to the carrier CR, the one-way clutch F is locked so that the rotation of the engine 11 is stopped and no rotation of the reverse direction is transmitted to the engine 11. Accordingly, when the electric generator 16 is operated in the stopping state of the driving of the engine 11, reaction force is applied to torque transmitted from the electric generator 16 by the one-way clutch F. An unillustrated brake (as a stopping means) can be also arranged instead of the one-way clutch F between the carrier CR and the case 10.

The electric generator 16 includes a rotor 21 fixed to the transmission shaft 17 and rotatably arranged, a stator 22 arranged around this rotor 21, and a coil 23 wound around this stator 22. The electric generator 16 generates electric power by the rotation transmitted through the transmission shaft 17. Therefore, the coil 23 is connected to an unillustrated battery and supplies a direct electric current to the battery. An electric generator brake B is arranged between the rotor 21 and the case 10. The rotor 21 is fixed by engaging the electric generator brake B and the rotation of the electric generator 16 can be mechanically stopped.

Reference numeral 26 designates an output shaft arranged on the second axis, and the rotation of the drive motor 25 is outputted to the output shaft 26. Reference numeral 27 designates a second counter drive gear (as an output gear) fixed to this output shaft 26. The drive motor 25 includes a rotor 40 fixed to the output shaft 26 and rotatably arranged, a stator 41 arranged around this rotor 40, and a coil 42 wound around this stator 41.

The drive motor 25 generates drive motor torque TM as torque of the drive motor 25 by the electric currents of U-phase, V-phase and W-phase as alternating electric currents supplied to the coil 42. Therefore, the coil 42 is connected to the battery, and the direct electric current from this battery is converted into the electric current of each phase and is supplied to the coil 42.

A counter shaft 30 is arranged on a third axis parallel to the first and second axes to rotate the drive wheel 37 in the same direction as the rotation of the engine 11. A first counter driven gear 31 and a second counter driven gear 32, having a tooth number larger than that of this first counter driven gear 31, are fixed to this counter shaft 30. The first counter driven gear 31 and the first counter drive gear 15 are engaged with each other. Further, the second counter driven gear 32 and the second counter drive gear 27 are engaged with each other. The rotation of the first counter drive gear 15 is inverted and transmitted to the first counter driven gear 31. The rotation of the second counter drive gear 27 is inverted and transmitted to the second counter driven gear 32.

Further, a diff pinion gear 33 having a tooth number smaller than that of the first counter driven gear 31 is fixed to the counter shaft 30.

A differential device 36 is arranged on a fourth axis parallel to the first to third axes. A diff ring gear 35 of this differential device 36 and the diff pinion gear 33 are engaged with each other. Accordingly, rotation transmitted to the diff ring gear 35 is distributed by the differential device 36 and is transmitted to the drive wheel 37.

Thus, the rotation generated by the engine 11 can be transmitted to the first counter driven gear 31, and the rotation generated by the drive motor 25 can be also transmitted to the second counter driven gear 32. Accordingly, it is possible to run the hybrid vehicle by driving the engine 11 and the drive motor 25.

In the hybrid vehicle of the construction, when an unillustrated shift lever (as a speed change operating member) is operated, and a predetermined range among an advance range, a retreating range, a neutral range and a parking range is selected, an unillustrated shift position judging device judges the selected range and generates a range position signal and sends this range position signal to the unillustrated vehicle drive unit.

Reference numeral 38 designates a position sensor such as a resolver, etc. (as a first rotor position detecting section) for detecting a rotor position $\theta G$ as the position of the rotor 21. Reference numeral 39 designates a position sensor such as a resolver, etc. (as a second rotor position detecting section) for detecting a rotor position $\theta M$ as the position of the rotor 40. The detected rotor position $\theta G$ is sent to an unillustrated vehicle controller and an unillustrated electric generator controller. The rotor position $\theta M$ is sent to the vehicle controller and an unillustrated drive motor controller. Reference numeral 50 designates a drive shaft (as an output shaft) of the differential device 36. Reference numeral 52 designates an engine rotating speed sensor (as an engine rotating speed detecting section) for detecting an engine rotating speed NE as the rotating speed of the engine 11. The detected engine rotating speed NE is sent to the vehicle controller and an unillustrated engine controller. The vehicle drive unit includes the engine 11, the planetary gear unit 13, the electric generator 16, the drive motor 25, the counter shaft 30, the differential device 36, etc.

The operation of the planetary gear unit 13 will next be explained.

Figure 3:
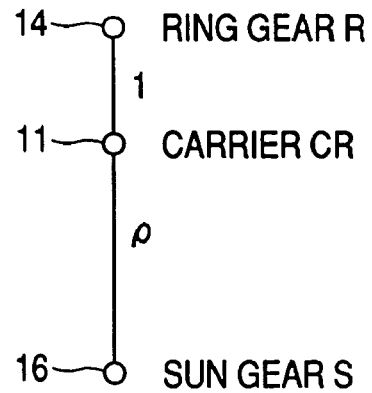
FIG. 3 explains the operation of a planetary gear unit of the first embodiment of the invention.
Figure 4:
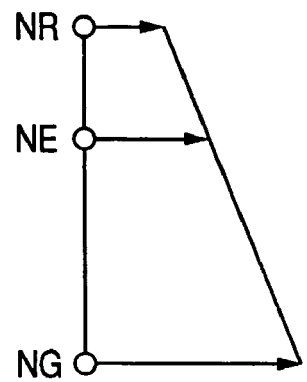
FIG. 4 is a vehicle speed diagram at a normal running time of the first embodiment of the invention.
Figure 5:
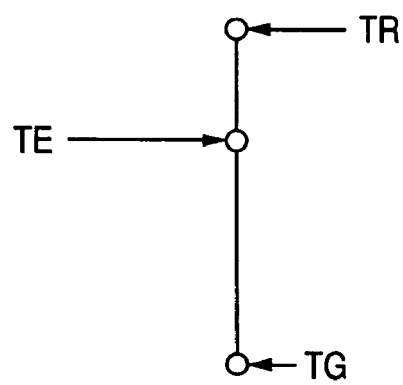
FIG. 5 is a torque diagram at the normal running time of the first embodiment of the invention.

FIG. 3 explains the operation of the planetary gear unit of the first embodiment of the invention. FIG. 4 is a vehicle speed diagram at a normal running time of the first embodiment of the invention. FIG. 5 is a torque diagram at the normal running time of the first embodiment of the invention.

In the planetary gear unit 13 (FIG. 2), the carrier CR is connected to the engine 11, and the sun gear S is connected to the electric generator 16. The ring gear R is connected to the drive motor 25 and the drive wheel 37 through the output shaft 14 and a predetermined gear series, respectively. Accordingly, a ring gear rotating speed NR (as the rotating speed of the ring gear R) and an output shaft rotating speed (as the rotating speed outputted to the output shaft 14) are equal to each other. The rotating speed of the carrier CR and the engine rotating speed NE are equal to each other. The rotating speed of the sun gear S and an electric generator rotating speed NG (as the rotating speed of the electric generator 16) are equal to each other. When the tooth number of the ring gear R is set to ρ times (twice in this embodiment) the tooth number of the sun gear S, the relation of $$(\rho+1) \cdot NE = 1 \cdot NG + \rho \cdot NR$$

is formed. Accordingly, the engine rotating speed NE:

$$NE = (1 \cdot NG + \rho \cdot NR)/(\rho+1) \qquad (1)$$

can be calculated on the basis of the ring gear rotating speed NR and the electric generator rotating speed NG. The rotating speed relation formula of the planetary gear unit 13 is calculated by formula (1).

The relation of $$TE:TR:TG = (\rho+1):\rho:1 \qquad (2)$$

is formed with respect to the engine torque TE, the ring gear torque TR (as torque generated in the ring gear R), and the electric generator torque TG, and reaction forces are applied to each other. The torque relation formula of the planetary gear unit 13 is calculated by formula (2).

At the normal running time of the hybrid vehicle, each of the ring gear R, the carrier CR and the sun gear S is rotated in the positive direction. As shown in FIG. 4, each of the ring gear rotating speed NR, the engine rotating speed NE and the electric generator rotating speed NG has a positive value. The ring gear torque TR and the electric generator torque TG are obtained by proportionally dividing the engine torque TE in a torque ratio determined by the tooth number of the planetary gear unit 13. Accordingly, in the torque diagram shown in FIG. 5, torque obtained by adding the ring gear torque TR and the electric generator torque TG becomes the engine torque TE.

The hybrid vehicle drive controller (as an electrically operated vehicle drive controller) for controlling the operation of the vehicle drive unit will next be explained.

Figure 6:
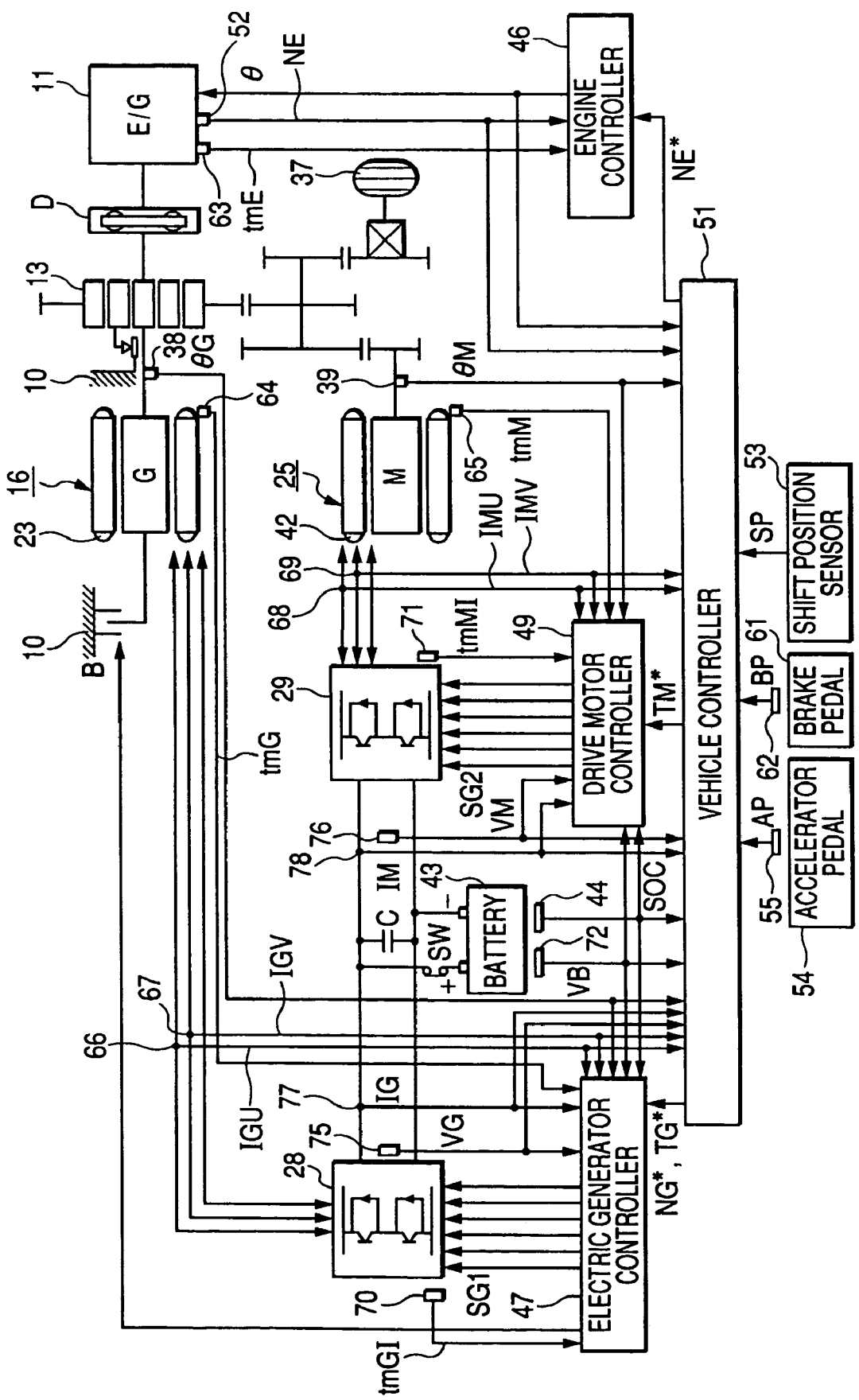
FIG. 6 is a conceptual view of a hybrid vehicle drive controller of the first embodiment of the invention.

FIG. 6 is a conceptual view of the hybrid vehicle drive controller of the first embodiment of the invention.

In this figure, reference numerals 10, 11 and 13 respectively designate the case, the engine (E/G) and the planetary gear unit. Reference numerals 16, B and 25 respectively designate the electric generator (G), an electric generator brake and the drive motor (M). Reference numerals 28, 29 and 37 respectively designate an inverter (as an electric generator inverter) for operating the electric generator 16, an inverter (as a drive motor inverter) for driving the drive motor 25, and the drive wheel. Reference numerals 38 and 39 designate the rotor position sensors. Reference numeral 43 designates the battery. The inverters 28 and 29 are connected to the battery 43 through a power switch SW. The battery 43 supplies a direct electric current to the inverters 28 and 29 when the power switch SW is turned on. Each of the inverters 28 and 29 has a plurality of transistors (e.g., six transistors) as switching elements. Each transistor is formed as a unit every pair, and constitutes a transistor module of each phase.

An electric generator inverter voltage sensor 75 (as a first direct current voltage detecting section) is arranged on the inlet side of the inverter 28 to detect a direct current voltage VG applied to the inverter 28. An electric generator inverter electric current sensor 77 (as a first direct electric current detecting section) is arranged on the inlet side of the inverter 28 to detect a direct electric current IG supplied to the inverter 28. A drive motor inverter voltage sensor 76 (as a second direct current voltage detecting section) is arranged on the inlet side of the inverter 29 to detect a direct current voltage VM applied to the inverter 29. A drive motor inverter electric current sensor 78 (as a second direct electric current detecting section) is arranged on the inlet side of the inverter 29 to detect a direct electric current IM supplied to the inverter 29. The direct current voltage VG and the direct electric current IG are sent to a vehicle controller 51 and an electric generator controller 47. The direct current voltage VM and the direct electric current IM are sent to the vehicle controller 51 and a drive motor controller 49. A capacitor C for smoothing is connected between the battery 43 and the inverters 28, 29.

Further, the vehicle controller 51 includes unillustrated CPU, recorder, etc. and controls the entire operation of the vehicle drive unit and functions as a computer in accordance with predetermined program, data, etc. An engine controller 46, the electric generator controller 47 and the drive motor controller 49 are connected to the vehicle controller 51. The engine controller 46 includes an unillustrated CPU, recorder, etc., and sends instruction signals of a throttle aperture θ, valve timing, etc. to the engine 11 and the vehicle controller 51 to control the operation of the engine 11. The electric generator controller 47 includes an unillustrated CPU, recorder, etc., and sends a driving signal SG1 to the inverter 28 to control the operation of the electric generator 16. The drive motor controller 49 includes an unillustrated CPU, recorder, etc., and sends a driving signal SG2 to the inverter 29 to control the operation of the drive motor 25. A first controller located in a lower position from the vehicle controller 51 includes the engine controller 46, the electric generator controller 47 and the drive motor controller 49. A second controller, located in an upper position from the engine controller 46, the electric generator controller 47 and the drive motor controller 49, includes the vehicle controller 51. Further, the engine controller 46, the electric generator controller 47 and the drive motor controller 49 also function as a computer in accordance with predetermined program, data, etc.

The inverter 28 is operated in accordance with the driving signal SG1. At a power applying time, the inverter 28 receives the direct electric current from the battery 43, generates electric currents IGU, IGV, IGW of the respective phases, and supplies the electric currents IGU, IGV, IGW of the respective phases to the electric generator 16. At a regenerative time, the inverter 28 receives the electric currents IGU, IGV, IGW of the respective phases from the electric generator 16, and generates and supplies the direct electric current to the battery 43.

The inverter 29 is operated in accordance with the driving signal SG2. At the power applying time, the inverter 29 receives the direct electric current from the battery 43, generates electric currents IMU, IMV, IMW of the respective phases, and supplies the electric currents IMU, IMV, IMW of the respective phases to the drive motor 25. At the regenerative time, the inverter 29 receives the electric currents IMU, IMV, IMW of the respective phases from the drive motor 25 and generates and supplies the direct electric current to the battery 43.

Reference numeral 44 designates a battery remaining amount detector for detecting a battery remaining amount SOC (as a battery state) constituting the state of the battery 43. Reference numeral 52 designates an engine rotating speed sensor. Reference numeral 53 designates a shift position sensor for detecting a shift position SP. Reference numeral 54 designates an accelerator pedal. Reference numeral 55 designates an accelerator switch (as an accelerator operation detecting section) for detecting an accelerator pedal position AP (as the position (stepping-in amount) of the accelerator pedal 54). Reference numeral 61 designates a brake pedal. Reference numeral 62 designates a brake switch (as a brake operation detecting section) for detecting a brake pedal position BP (as the position (stepping-in amount) of the brake pedal 61). Reference numeral 63 designates an engine temperature sensor for detecting the temperature tmE of the engine 11. Reference numeral 64 designates an electric generator temperature sensor for detecting the temperature of the electric generator 16 (e.g., the temperature tmG of the coil 23). Reference numeral 65 designates a drive motor temperature sensor for detecting the temperature of the drive motor 25 (e.g., the temperature tmM of the coil 42). Reference numeral 70 designates a first inverter temperature sensor for detecting the temperature tmGI of the inverter 28. Reference numeral 71 designates a second inverter temperature sensor for detecting the temperature tmMI of the inverter 29. The temperature tmE is sent to the engine controller 46. The temperatures tmG, tmGI are sent to the electric generator controller 47. The temperatures tmM, tmMI are sent to the drive motor controller 49.

Further, reference numerals 66 to 69 designate electric current sensors (as an alternating electric current detecting section) for detecting the electric currents IGU, IGV, IMU, IMV of the respective phases. Reference numeral 72 designates a battery voltage sensor (as a third direct current voltage detecting section) for detecting a direct current voltage as the battery state, i.e., a battery voltage VB. The battery voltage VB and the battery remaining amount SOC are sent to the electric generator controller 47, the drive motor controller 49 and the vehicle controller 51. A battery electric current (as the direct electric current) battery temperature, etc. can be also detected as the battery state. A battery state detecting section includes the battery remaining amount detector 44, the battery voltage sensor 72, an unillustrated battery electric current sensor, an unillustrated battery temperature sensor, etc. Further, the electric currents IGU, IGV are sent to the electric generator controller 47 and the vehicle controller 51. The electric currents IMU, IMV are supplied to the drive motor controller 49 and the vehicle controller 51.

The vehicle controller 51 sends an engine control signal to the engine controller 46, and sets starting and stoppage of the engine 11 by the engine controller 46.

An unillustrated electric generator rotating speed calculation processing means of the electric generator controller 47 performs electric generator rotating speed calculation processing, reads the rotor position θG, calculates a changing ratio δθG by differentiating the rotor position θG, and sets this changing ratio δθG to an angular velocity ωG of the electric generator 16 and the electric generator rotating speed NG. An unillustrated electric generator angular acceleration calculation processing means of the electric generator controller 47 performs electric generator angular acceleration calculation processing and calculates the angular acceleration (rotation changing ratio) αG of the electric generator 16 by further differentiating the changing ratio δθG.

An unillustrated drive motor rotating speed calculation processing means of the drive motor controller 49 performs drive motor rotating speed calculation processing, reads the rotor position θM, calculates a changing ratio δθM by differentiating the rotor position θM, and sets this changing ratio δθM to an angular velocity ωM of the drive motor 25 and the drive motor rotating speed NM as the rotating speed of the drive motor 25. An unillustrated drive motor angular acceleration calculation processing means of the drive motor controller 49 performs drive motor angular acceleration calculation processing and calculates the angular acceleration ωM of the drive motor 25 by further differentiating the changing ratio δθM.

Further, an unillustrated vehicle speed calculation processing means of the vehicle controller 51 performs vehicle speed calculation processing, reads the changing ratio δθM, and calculates a vehicle speed V on the basis of this changing ratio δθM and a gear ratio Kdm from the drive shaft 50 to the output shaft 26.

The vehicle controller 51 sets an engine target rotating speed NE*, which is a target value of the engine rotating speed NE; an electric generator target rotating speed NG*, which is a target value of the electric generator rotating speed NG; electric generator target torque TG*, which is a target value of electric generator torque TG (as torque of the electric generator 16); and drive motor target torque TM*, which is a target value of drive motor torque TM. The vehicle controller 51 then sends the engine target rotating speed NE* to the engine controller 46, sends the electric generator target rotating speed NG* and the electric generator target torque TG* to the electric generator controller 47, and also sends the drive motor target torque TM* to the drive motor controller 49. A control command value includes the engine target rotating speed NE*, the electric generator target rotating speed NG*, the electric generator target torque TG*, the drive motor target torque TM*, etc.

The rotor position θG and the electric generator rotating speed NG are proportional to each other. The rotor position θM, the drive motor rotating speed NM and the vehicle speed V are proportional to each other. Accordingly, the position sensor 38 and the electric generator rotating speed calculation processing means can be also set to function as an electric generator rotating speed detecting section for detecting the electric generator rotating speed NG. The position sensor 39 and the drive motor rotating speed calculation processing means can be also set to function as a drive motor rotating speed detecting section for detecting the drive motor rotating speed NM. The position sensor 39 and the vehicle speed calculation processing means can be also set to function as a vehicle speed detecting section for detecting the vehicle speed V.

In this embodiment, the engine rotating speed NE is detected by the engine rotating speed sensor 52, but the engine rotating speed NE can be also calculated in the engine controller 46. Further, in this embodiment, the vehicle speed V is calculated by the vehicle speed calculation processing means on the basis of the rotor position θM. However, the ring gear rotating speed NR is detected and the vehicle speed V can be also calculated on the basis of this ring gear rotating speed NR, and can be also calculated on the basis of the drive wheel rotating speed as the rotating speed of the drive wheel 37. In this case, a ring gear rotating speed sensor, a drive wheel rotating speed sensor, etc. may include the vehicle speed detecting section.

The operation of the hybrid vehicle drive controller of the construction will next be explained.

Figure 7:
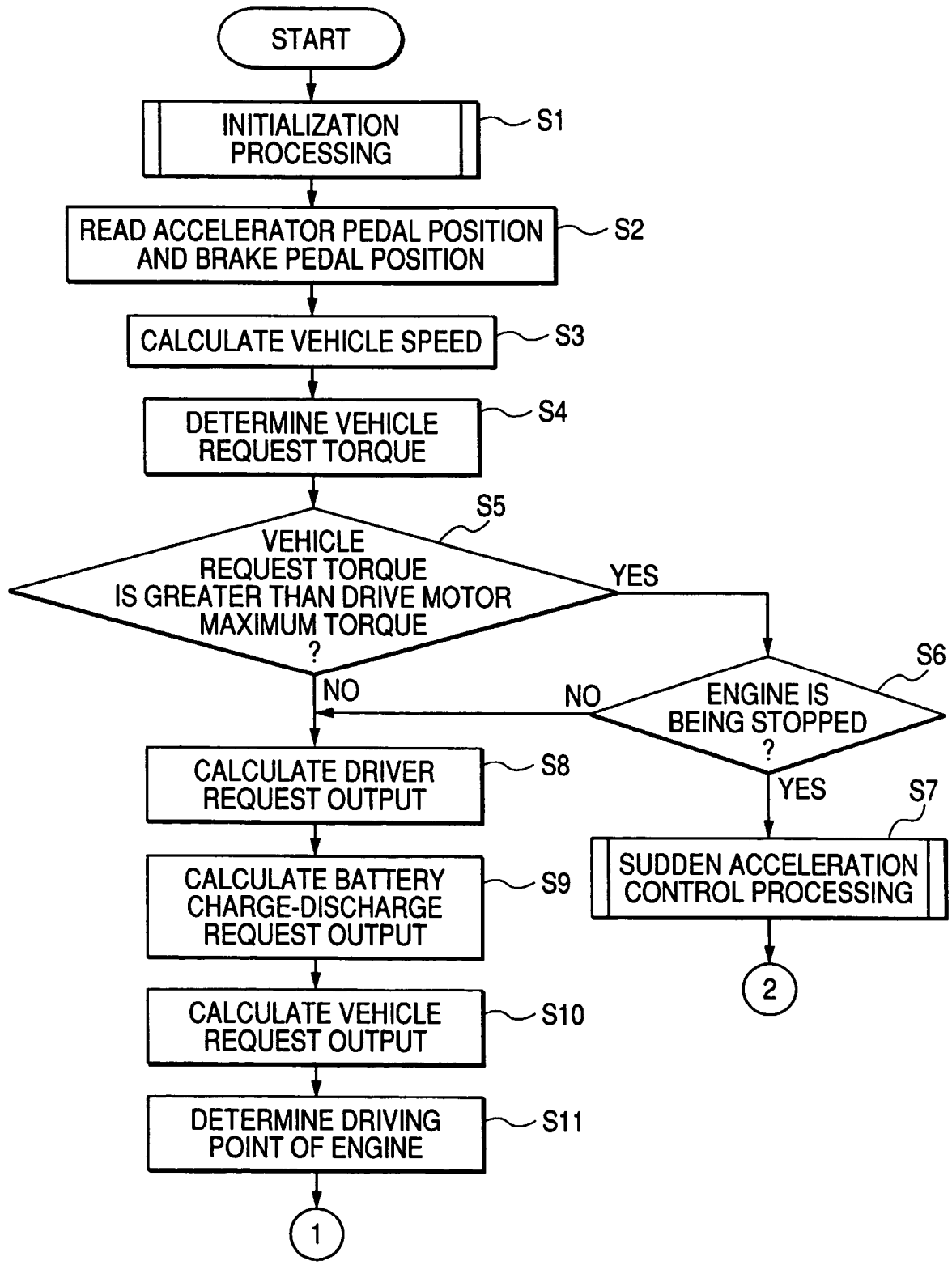
FIG. 7 is a first main flow chart showing the operation of the hybrid vehicle drive controller of the first embodiment of the invention.
Figure 8:
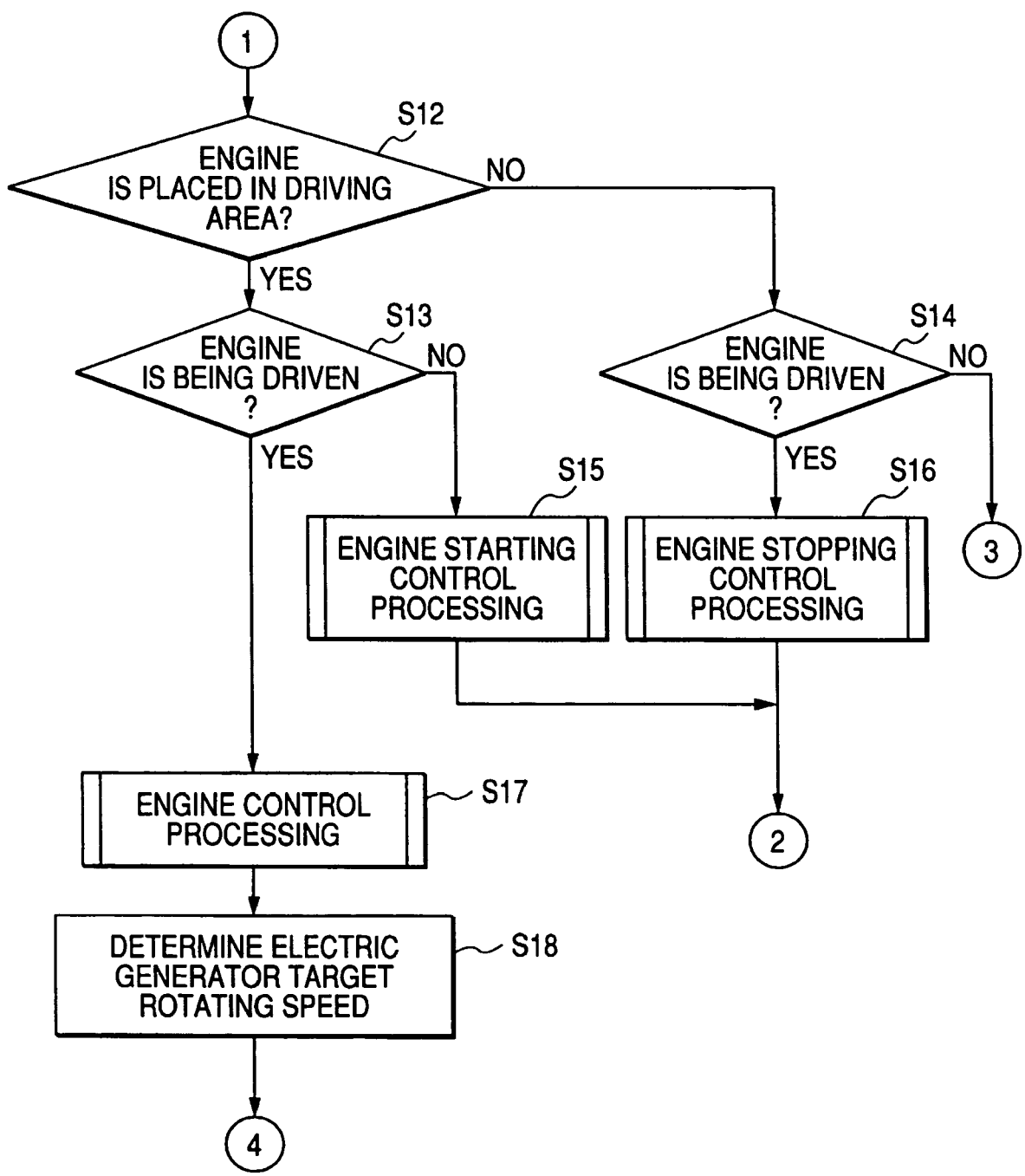
FIG. 8 is a second main flow chart showing the operation of the hybrid vehicle drive controller of the first embodiment of the invention.
Figure 9:
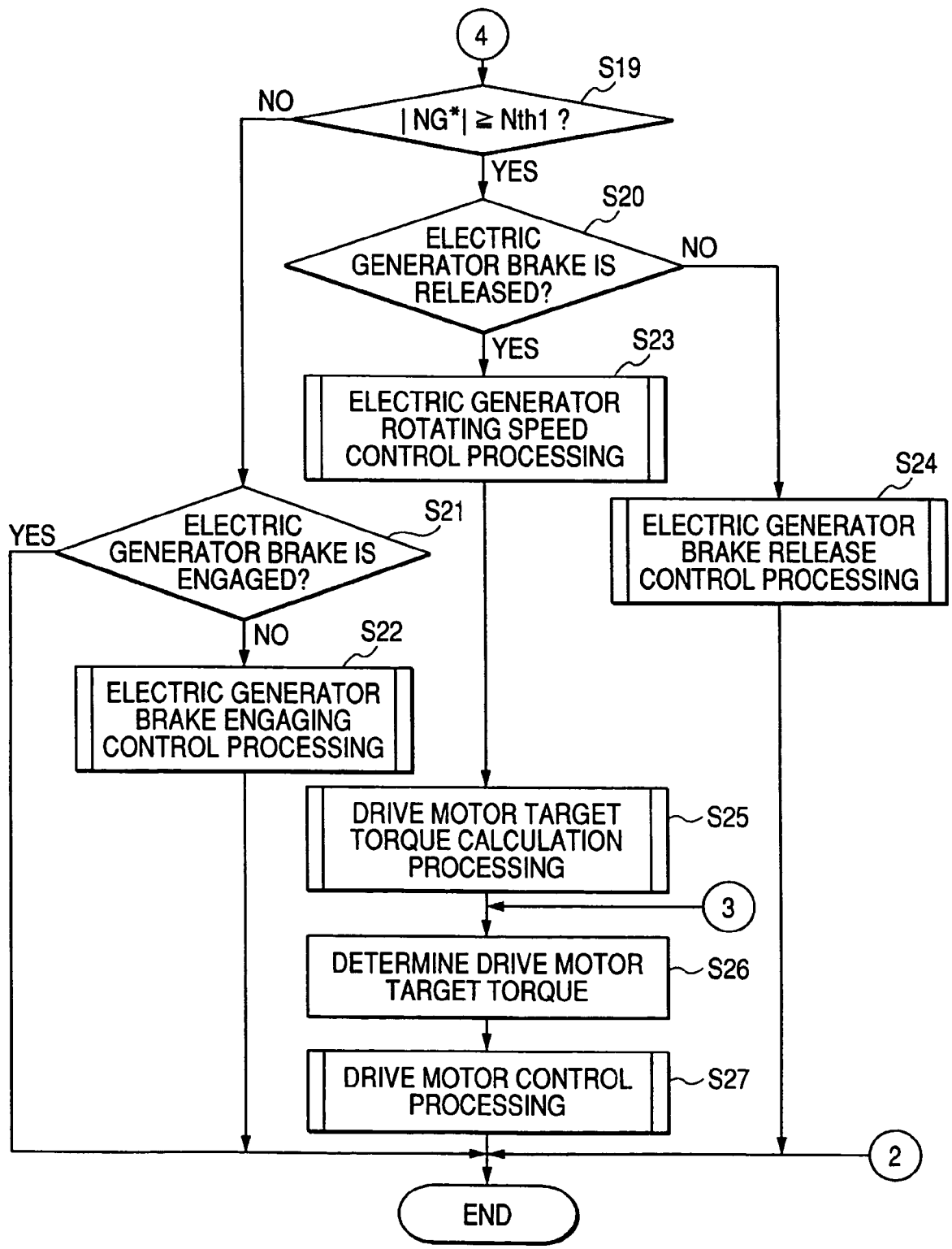
FIG. 9 is a third main flow chart showing the operation of the hybrid vehicle drive controller of the first embodiment of the invention.
Figure 10:
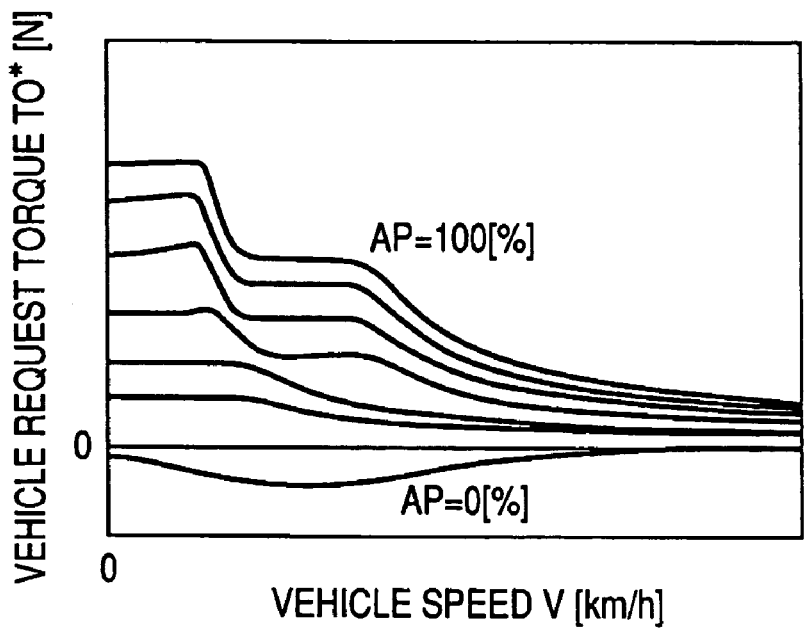
FIG. 10 is a view showing a first vehicle request torque map of the first embodiment of the invention.
Figure 11:
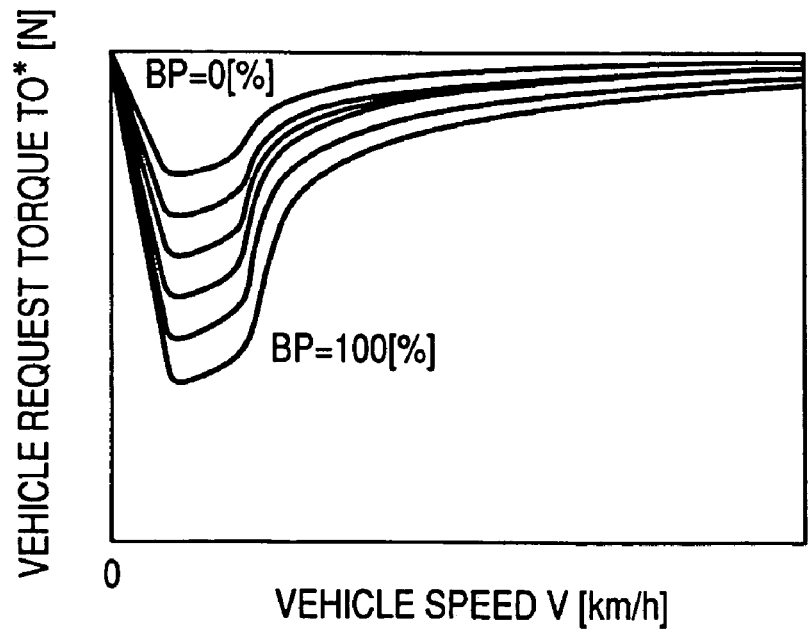
FIG. 11 is a view showing a second vehicle request torque map of the first embodiment of the invention.
Figure 12:
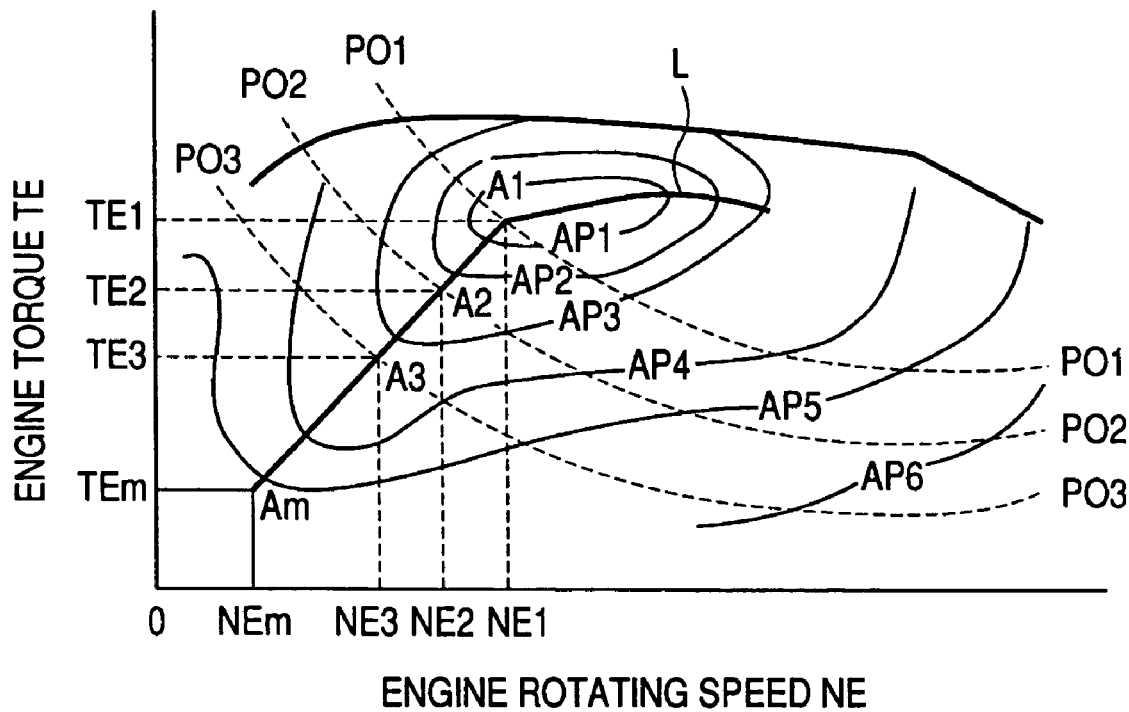
FIG. 12 is a view showing an engine target operating state map of the first embodiment of the invention.
Figure 13:
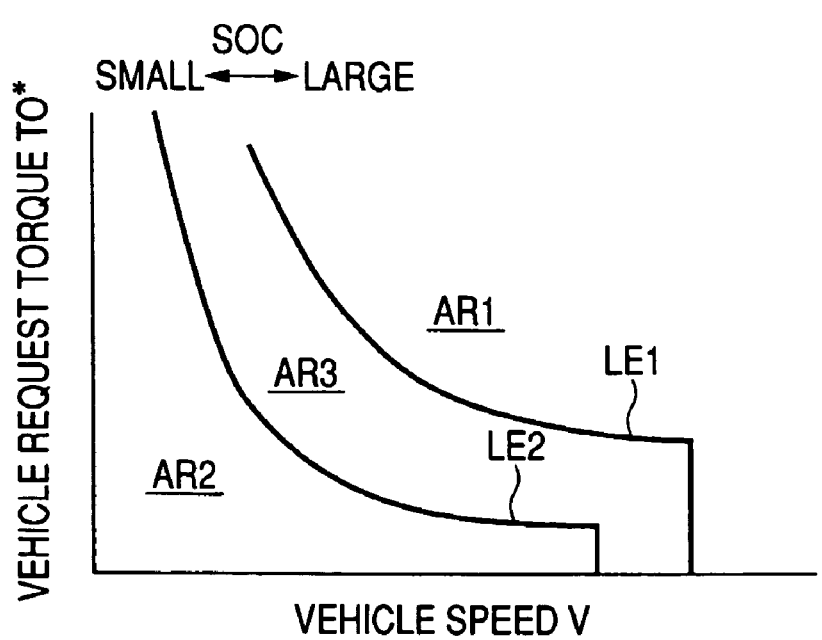
FIG. 13 is a view showing an engine driving area map of the first embodiment of the invention.

FIG. 7 is a first main flow chart showing the operation of the hybrid vehicle drive controller of the first embodiment of the invention. FIG. 8 is a second main flow chart showing the operation of the hybrid vehicle drive controller of the first embodiment of the invention. FIG. 9 is a third main flow chart showing the operation of the hybrid vehicle drive controller of the first embodiment of the invention. FIG. 10 shows a first vehicle request torque map of the first embodiment of the invention. FIG. 11 shows a second vehicle request torque map of the first embodiment of the invention. FIG. 12 shows an engine target operating state map of the first embodiment of the invention. FIG. 13 shows an engine driving area map of the first embodiment of the invention. In FIGS. 10, 11 and 13, the axis of abscissa is set to the vehicle speed V and the axis of ordinate is set to the vehicle request torque TO*. In FIG. 12, the axis of abscissa is set to the engine rotating speed NE and the axis of ordinate is set to the engine torque TE.

An unillustrated initialization processing means of the vehicle controller 51 (FIG. 6) first sets various kinds of variables to initial values by performing initialization processing (S1). Next, the vehicle controller 51 reads the accelerator pedal position AP from the accelerator switch 55 and also reads the brake pedal position BP from the brake switch 62 (S2). The vehicle speed calculation processing means reads the rotor position θM and calculates the changing ratio δθM of the rotor position θM and also calculates the vehicle speed V on the basis of the changing ratio δθM and the gear ratio Kdm (S3).

Subsequently, an unillustrated vehicle request torque determination processing means of the vehicle controller 51 performs vehicle request torque determination processing. When the accelerator pedal 54 is stepped in, the unillustrated vehicle request torque determination processing means of the vehicle controller 51 refers to the first vehicle request torque map of FIG. 10 recorded to the recorder of the vehicle controller 51. When the brake pedal 61 is stepped in, the vehicle request torque determination processing means refers to the second vehicle request torque map of FIG. 11 recorded to the recorder. The vehicle request torque determination processing means then determines vehicle request torque TO* required to run the hybrid vehicle and set in advance correspondingly to the accelerator pedal position AP, the brake pedal position BP and the vehicle speed V (S4).

Next, the vehicle controller 51 judges whether the vehicle request torque TO* is greater than drive motor maximum torque TMmax which is a maximum value of the drive motor torque TM (S5). When the vehicle request torque TO* is greater than the drive motor maximum torque TMmax, the vehicle controller 51 judges whether the operation of the engine 11 is being stopped (S6). When the operation of the engine 11 is being stopped, an unillustrated sudden acceleration control processing means of the vehicle controller 51 performs sudden acceleration control processing, and runs the hybrid vehicle by driving the drive motor 25 and the electric generator 16 (S7).

When the vehicle request torque TO* is the drive motor maximum torque TMmax or less or the vehicle request torque TO* is greater than the drive motor maximum torque TMmax and the operation of the engine 11 is not being stopped, an unillustrated driver request output calculation processing means of the vehicle controller 51 performs driver request output calculation processing and calculates a driver request output PD:

$$PD = TO^* \times V$$

by multiplying the vehicle request torque TO* and the vehicle speed V (S8). When the vehicle request torque TO* and the drive motor maximum torque TMmax are compared, the drive motor maximum torque TMmax is really multiplied by the gear ratio Kdm and the vehicle request torque TO* and the multiplied value are compared. Thereby, the first and second vehicle request torque maps can be also made by predicting the gear ratio Kdm in advance.

Next, an unillustrated battery charge-discharge request output calculation processing means of the vehicle controller 51 performs battery charge-discharge request output calculation processing and reads the battery remaining amount SOC from the battery remaining amount detector 44 and calculates a battery charge-discharge request output PB on the basis of this battery remaining amount SOC (S9).

Subsequently, an unillustrated vehicle request output calculation processing means of the vehicle controller 51 performs vehicle request output calculation processing and calculates a vehicle request output PO:

$$PO = PD + PB$$

by adding the driver request output PD and the battery charge-discharge request output PB (S10).

Next, an unillustrated engine target operating state setting processing means of the vehicle controller 51 performs engine target operating state setting processing. With reference to the engine target operating state map of FIG. 12 recorded to the recorder of the vehicle controller 51, the engine target operating state setting processing means determines crossing points A1 to Am of lines PO1, PO2, . . . of the vehicle request output PO and an optimum fuel cost curve L representing the highest efficiency of the engine 11 in each of accelerator pedal positions AP1 to AP6 (S11). The crossing points A1 to Am are operating points of the engine 11 at engine target operating states. The engine target operating state setting processing means also determines engine torques TE1 to TEm at operating points A1 to Am as engine target torque TE*, which are target values of the engine torque TE. The engine target operating state setting processing means further determines engine rotating speeds NE1 to NEm at the operating points A1 to Am as the engine target rotating speed NE* and sends this engine target rotating speed NE* to the engine controller 46.

The engine controller 46 then judges whether the engine 11 is located in a driving area AR1 with reference to the engine driving area map of FIG. 13 recorded to the recorder of the engine controller 46 (S12). In FIG. 13, AR1 shows the driving area for driving the engine 11, AR2 shows a stopping area for stopping the driving of the engine 11, and AR3 shows a hysteresis area. Further, LE1 shows a line for driving the stopped engine 11, and LE2 shows a line for stopping the driving of the driven engine 11. As the battery remaining amount SOC is increased, the line LE1 is moved rightward in FIG. 13 and the driving area AR1 is narrowed. In contrast to this, as the battery remaining amount SOC is reduced, the line LE1 is moved leftward in FIG. 13 and the driving area AR1 is widened.

When the engine 11 is located in the driving area AR1 (S12) but the engine 11 is not driven (S14), an unillustrated engine starting control processing means of the engine controller 46 performs engine starting control processing and starts the engine 11 (S15).

When the engine 11 is not located in the driving area AR1 (S12) but the engine 11 is driven (S14), an unillustrated engine stopping control processing means of the engine controller 46 performs engine stopping control processing and stops the driving of the engine 11 (S16). the engine 11 is not located in the driving area AR1 (S12) and the engine 11 is not being driven (S14), the vehicle controller 51 determines the vehicle request torque TO*, which is the drive motor target torque TM*, and sends this drive motor target torque TM* to the drive motor controller 49 (S26). An unillustrated drive motor control processing means of the drive motor controller 49 then performs drive motor control processing and controls the torque of the drive motor 25 (S27).

When the engine 11 is located in the driving area AR1 (S12) and the engine 11 is driven (S13), an unillustrated engine control processing means of the engine controller 46 performs engine control processing and controls the operation of the engine 11 by a predetermined method (S17).

Next, an unillustrated electric generator target rotating speed calculation processing means of the vehicle controller 51 performs electric generator target rotating speed calculation processing and concretely reads the rotor position θM from the position sensor 39 and calculates the ring gear rotating speed NR on the basis of this rotor position θM and the gear ratio γR from the output shaft 26 to the ring gear R. Further, the electric generator target rotating speed calculation processing means reads the engine target rotating speed NE* determined in the engine target operating state setting processing, and calculates and determines the electric generator target rotating speed NG* by the rotating speed relation formula on the basis of the ring gear rotating speed NR and the engine target rotating speed NE* (S18).

When the hybrid vehicle of the construction runs by the drive motor 25 and the engine 11 and the electric generator rotating speed NG is low, electric power consumption is increased and power generation efficiency of the electric generator 16 is reduced and the fuel cost of the hybrid vehicle correspondingly increases. Therefore, when the absolute value |NG*| of the electric generator target rotating speed NG* is smaller than a predetermined rotating speed Nth1 (e.g., 500 [rpm]), the fuel cost is improved by engaging the electric generator brake B and mechanically stopping the operation of the electric generator 16.

Therefore, the electric generator controller 47 judges whether the absolute value |NG*| is the predetermined rotating speed Nth1 or more (S17). When the absolute value |NG*| is smaller than the rotating speed Nth1, the electric generator controller 47 judges whether the electric generator brake B is engaged (S21). When the electric generator brake B is not engaged, an unillustrated electric generator brake engagement control processing means of the electric generator controller 47 performs electric generator brake engagement control processing and engages the electric generator brake B (S22).

When the absolute value |NG*| is the rotating speed Nth1 or more, the electric generator controller 47 judges whether the electric generator brake B is released (S20). When the electric generator brake B is not released, an unillustrated electric generator brake release control processing means of the electric generator controller 47 performs electric generator brake release control processing and releases the electric generator brake B (S24). When the electric generator brake B is released, an unillustrated electric generator rotating speed control processing means of the electric generator controller 47 performs electric generator rotating speed control processing and operates the electric generator 16 (S23).

The electric generator target torque calculation processing means of the electric generator rotating speed control processing means performs electric generator target torque calculation processing, and calculates the electric generator target torque TG* on the basis of the difference between the electric generator rotating speed NG and the electric generator target rotating speed NG* (S25). When the electric generator 16 is operated on the basis of the electric generator target torque TG* and predetermined electric generator torque TG is generated in the electric generator rotating speed control processing, the engine torque TE, the ring gear torque TR and the electric generator torque TG mutually receive reaction forces as mentioned above. Accordingly, the electric generator torque TG is converted into the ring gear torque TR and is outputted from the ring gear R.

When the electric generator rotating speed NG is changed and the ring gear torque TR is changed in outputting the ring gear torque TR from the ring gear R, the changed ring gear torque TR is transmitted to the drive shaft 50 (FIG. 2) and drive shaft torque as first output torque generated in this drive shaft 50 is changed. Thus, the drive shaft torque is excessive or deficient with respect to the vehicle request torque TO*, and a running feeling of the hybrid vehicle is reduced.

Therefore, an unillustrated drive motor target torque calculation processing means of the vehicle controller 51 performs drive motor target torque calculation processing, and calculates and determines drive motor target torque TM* correspondingly to the drive shaft torque (S26). Thus, the excessive and deficient amounts of the drive shaft torque with respect to the vehicle request torque TO* are compensated for by driving the drive motor 25.

Subsequently, the drive motor control processing means performs drive motor control processing, and performs torque control of the drive motor 25 on the basis of the determined drive motor target torque TM*, and controls the drive motor torque TM (S27).

The flow charts of FIGS. 7 to 9 will next be explained further.

Step S1 Initialization processing is performed.

Step S2 The accelerator pedal position AP and the brake pedal position BP are read.

Step S3 The vehicle speed V is calculated.

Step S4 The vehicle request torque TO* is determined.

Step S5 It is judged whether the vehicle request torque TO* is greater than the drive motor maximum torque TMmax. When the vehicle request torque TO* is greater than the drive motor maximum torque TMmax, it proceeds to step S6. When the vehicle request torque TO* is the drive motor maximum torque TMmax or less, it proceeds to step S8.

Step S6 It is judged whether the operation of the engine 11 is being stopped. When the operation of the engine 11 is being stopped, it proceeds to step S7. When the operation of the engine 11 is not being stopped, it proceeds to step S8.

Step S7 The sudden acceleration control processing is performed and the processing is terminated.

Step S8 The driver request output PD is calculated.

Step S9 The battery charge-discharge request output PB is calculated.

Step S10 The vehicle request output PO is calculated.

Step S11 The operating point of the engine 11 is determined.

Step S12 It is judged whether the engine 11 is located in the driving area AR1. When the engine 11 is located in the driving area AR1, it proceeds to step S13. When no engine 11 is located in the driving area AR1, it proceeds to step S14.

Step S13 It is judged whether the engine 11 is driven. When the engine 11 is driven, it proceeds to step S17. When no engine 11 is driven (the operation of the engine 11 is stopped), it proceeds to step S15.

Step S14 It is judged whether the engine 11 is driven. When the engine 11 is driven, it proceeds to step S16. When no engine 11 is driven, it proceeds to step S26.

Step S15 The engine starting control processing is performed and the processing is terminated.

Step S16 The engine stopping control processing is performed and the processing is terminated.

Step S17 The engine control processing is performed.

Step S18 The electric generator target rotating speed NG* is determined.

Step S19 It is judged whether the absolute value |NG*| is the rotating speed Nth1 or more. When the absolute value |NG*| is the rotating speed Nth1 or more, it proceeds to step S20. When the absolute value |NG*| is smaller than the rotating speed Nth1, it proceeds to step S21.

Step S20 It is judged whether the electric generator brake B is released. When the electric generator brake B is released, it proceeds to step S23. When no electric generator brake B is released, it proceeds to step S24.

Step S21 It is judged whether the electric generator brake B is engaged. When the electric generator brake B is engaged, the processing is terminated. When the electric generator brake B is not engaged, it proceeds to step S22.

Step S22 The electric generator brake engaging control processing is performed and the processing is terminated.

Step S23 The electric generator rotating speed control processing is performed.

Step S24 The electric generator brake release control processing is performed and the processing is terminated.

Step S25 The drive motor target torque calculation processing is performed.

Step S26 The drive motor target torque TM* is determined.

Step S27 The drive motor control processing is performed and the processing is terminated.

The drive motor target torque calculation processing of step S25 of FIG. 9 will next be explained.

Figure 1:
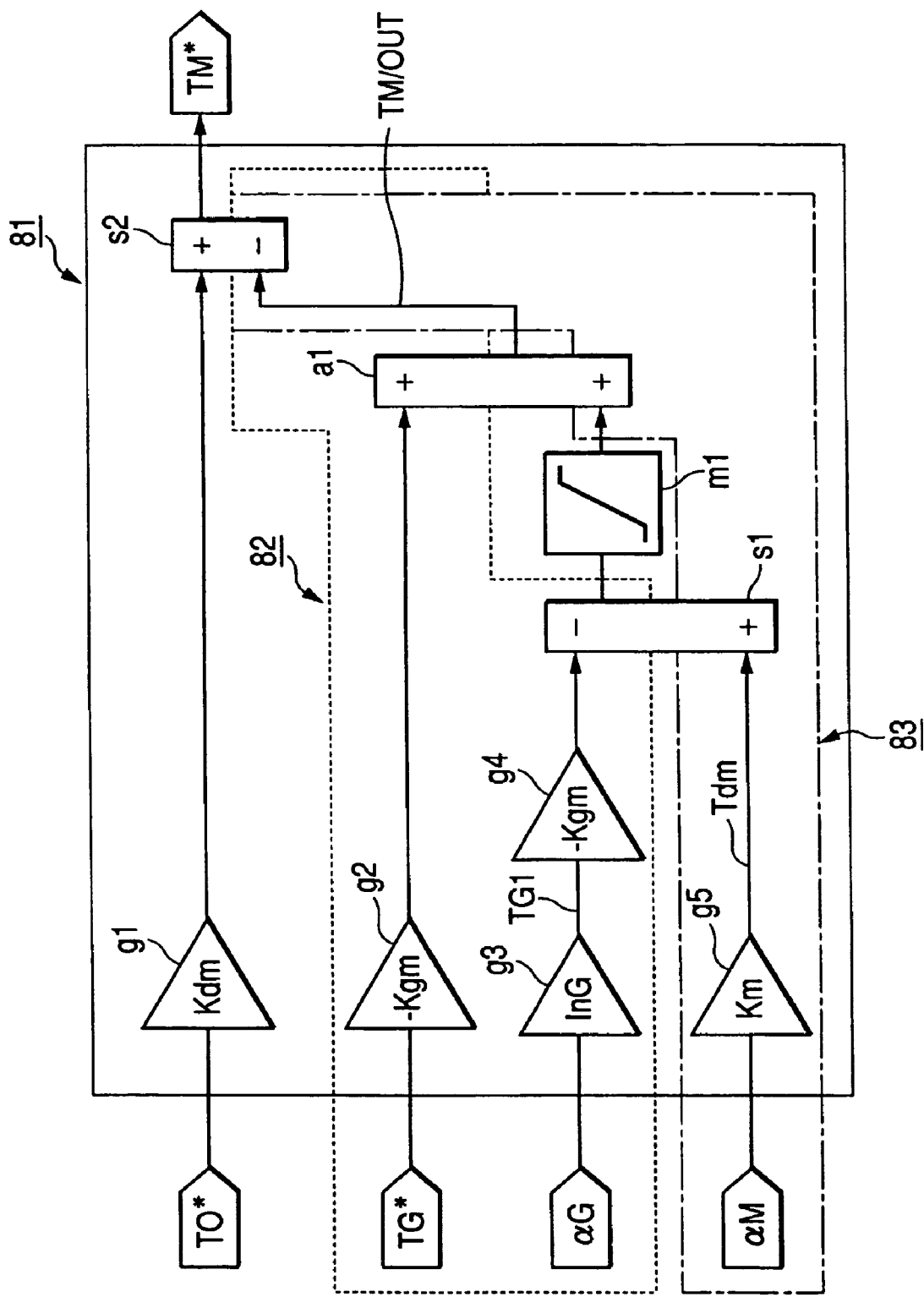
FIG. 1 is a drive motor target torque calculation processing section in a first embodiment of the invention.
Figure 14:
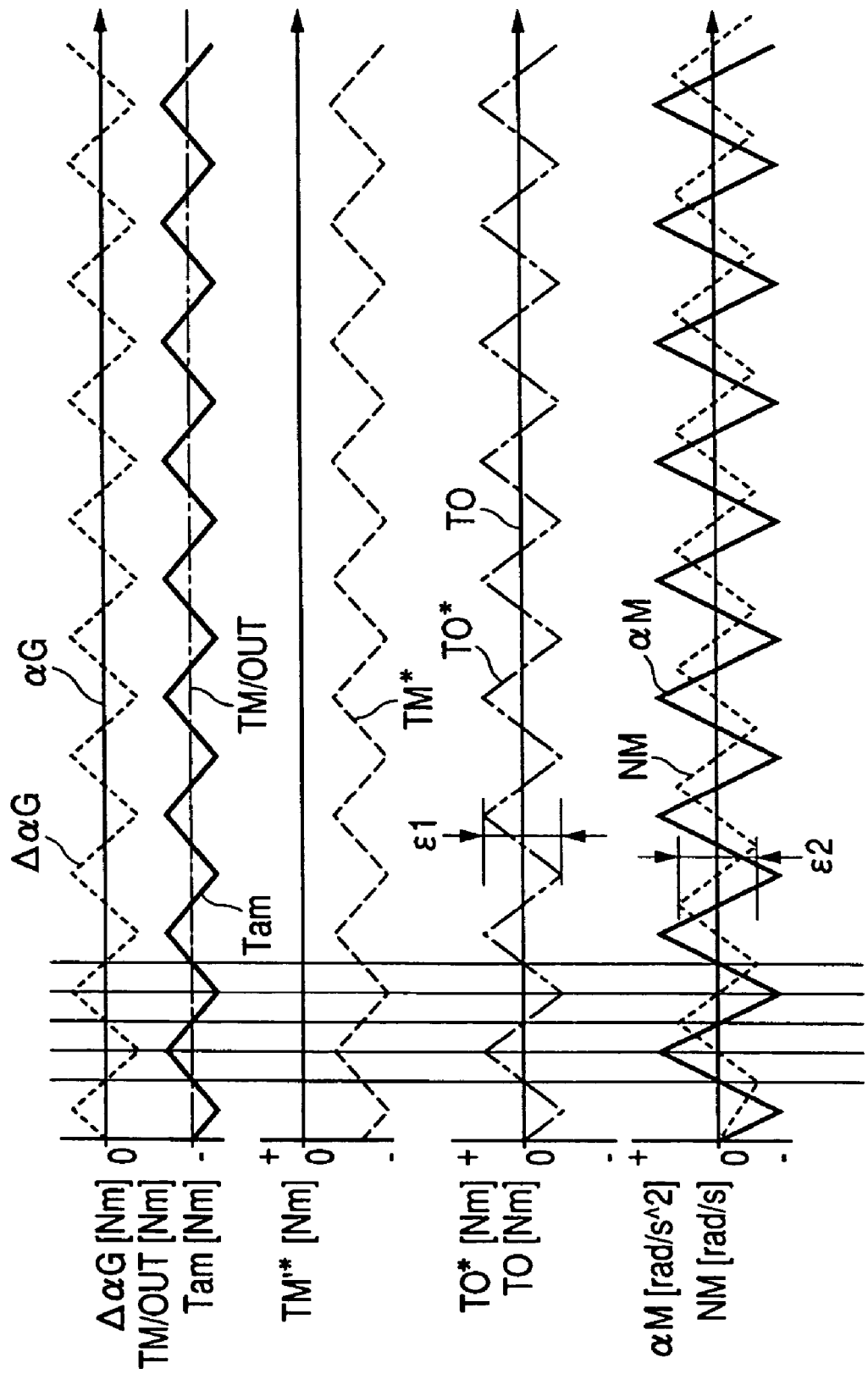
FIG. 14 is a time chart showing the operation of a conventional hybrid vehicle drive controller.
Figure 15:
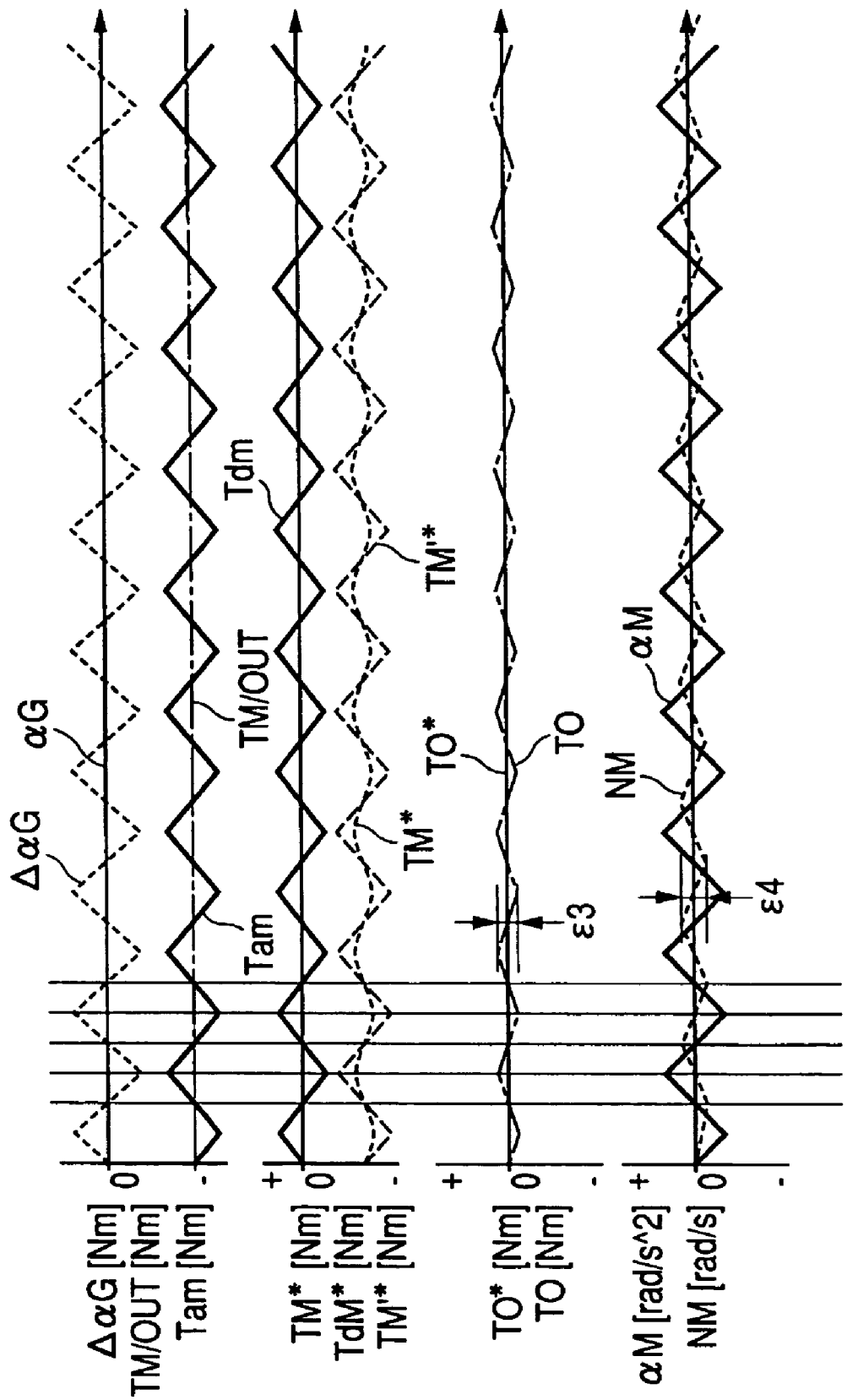
FIG. 15 is a time chart showing the operation of the hybrid vehicle drive controller of the first embodiment of the invention.

FIG. 1 shows a drive motor target torque calculation processing section of the first embodiment of the invention. FIG. 14 is a time chart showing the operation of a conventional hybrid vehicle drive controller. FIG. 15 is a time chart showing the operation of a hybrid vehicle drive controller of the first embodiment of the invention. In FIGS. 14 and 15, for convenience of the explanation, the hybrid vehicle is in a stopping state, and the vehicle speed V and the drive motor target rotating speed NM*, which is a target value of the drive motor rotating speed NM, are set to zero (0). The engine torque TE, the actual ring gear torque TR, and the engine rotating speed NE are constantly set, and the vehicle request torque TO* is set to zero.

In this case, when excessive and deficient amounts of the drive shaft torque with respect to the vehicle request torque TO* are calculated, the vehicle request torque TO* is converted into a calculation value Kdm×TO* as a value of the output shaft 26 of the drive motor 25 and the drive shaft torque is converted into output shaft torque TM/OUT as second output torque as a value of the output shaft 26, and the excessive and deficient amounts of the output shaft torque TM/OUT with respect to the calculated value Kdm×TO* are calculated.

In FIG. 1, reference numeral 81 designates a drive motor target torque calculating section as the drive motor target torque calculation processing means, and reference numerals g1 to g5 designate multipliers. Reference numerals s1 and s2 designate subtracters, and reference numeral m1 designates a limiter, and reference numeral a1 designates an adder. A correction torque calculation processing means includes the subtracter s1. The subtracter s1 performs correction torque calculation processing, and calculates correction torque Tc. A drive motor target torque generation processing means includes the subtracter s2. This subtracter s2 performs drive motor target torque generation processing, and generates drive motor target torque TM*. An inertia torque calculation processing means includes the multiplier g3. The multiplier g3 performs inertia torque calculation processing, and calculates inertia torque TGI as torque of the amount of inertia InG of the electric generator 16 (FIG. 2). Further, an inertia correction torque calculation processing means and an output torque presumption processing means include the adder a1. The adder a1 performs inertia correction torque calculation processing and output torque presumption processing, and calculates inertia correction torque Tam and presumes output shaft torque TM/OUT. A damping torque calculation processing means includes the multiplier g5. The multiplier g5 performs damping torque calculation processing, and calculates damping torque Tdm. A torque limit processing means includes the limiter m1. The limiter m1 performs torque limit processing and limits the correction torque Tc outputted from the subtracter s1.

Reference numeral 82 designates an inertia correction processing section as an inertia correction processing means. This inertia correction processing section 82 performs inertia correction processing, and calculates the inertia correction torque Tam on the basis of the electric generator target torque TG* and the inertia torque TGI, and presumes the output shaft torque TM/OUT. The inertia correction processing section 82 further adjusts the drive motor target torque TM* and compensates for the excessive and deficient amounts of the drive shaft torque. Therefore, the inertia correction processing section 82 has the multipliers g2 to g4, the subtracters s1 and s2 and the adder a1. Reference numeral 83 designates a damping torque correcting section as a damping torque correction processing means. This damping torque correcting section 83 performs damping torque correction processing, and corrects the output shaft torque TM/OUT on the basis of angular acceleration αM as an output torque changing index showing a change of the output shaft torque TM/OUT due to the inertia correction torque Tam and a damping coefficient Km as a correction coefficient. Therefore, the damping torque correcting section 83 has the multiplier g5, the subtracters s1 and s2 and the adder a1. The damping coefficient Km is set in advance so as to show the change of the output shaft torque TM/OUT when the output shaft torque TM/OUT is presumed and the drive motor target torque TM* is generated on the basis of the inertia correction torque Tam.

In this embodiment, the inertia correction torque Tam is calculated on the basis of the electric generator target torque TG* and the inertia torque TGI. However, instead of the electric generator target torque TG*, it is possible to use the electric generator torque TG corresponding to the electric generator target torque TG* presumed by the direct electric current IG, the electric currents IGU, IGV, IGW, etc.

The drive motor target torque calculating section 81 of the construction performs drive motor target torque calculation processing: As mentioned above, when the vehicle request torque TO* is determined in the vehicle request torque determination processing, the drive motor target torque calculating section 81 reads the vehicle request torque TO* and sends this vehicle request torque TO* to the multiplier g1. In this multiplier g1, the vehicle request torque TO* is multiplied by the gear ratio Kdm, and is converted into the calculation value Kdm×TO* on the output shaft 26, and this calculation value Kdm×TO* is sent to the subtracter s2. The gear ratio Kdm is set to zero or a positive value.

When the electric generator target torque TG* is determined in the electric generator target torque calculation processing, the drive motor target torque calculating section 81 reads the electric generator target torque TG* and sends this electric generator target torque TG* to the multiplier g2. In this multiplier g2, the electric generator target torque TG* is multiplied by a gear ratio −Kgm from the transmission shaft 17 to the output shaft 26, and is converted into a calculation value −Kgm×TG* on the output shaft 26, and this calculation value −Kgm×TG* is sent to the adder a1. The gear ratio −Kgm is set to zero or a negative value.

Further, the drive motor target torque calculating section 81 reads the angular acceleration aG of the electric generator 16, and sends this angular acceleration αG to the multiplier g3. In this multiplier g3, the inertia torque calculation processing is performed and the angular acceleration αG is multiplied by inertia (inertias of the rotor 21 and the transmission shaft 17) InG of the electric generator 16, and the inertia torque TGI:

$$TGI = InG \times \alpha G$$

is calculated and sent to the multiplier g4. Subsequently, the drive motor target torque calculating section 81 multiplies the inertia torque TGI by the gear ratio −Kgm in the multiplier g4, and converts the inertia torque TGI into the calculation value −Kgm×TGI on the output shaft 26, and sends this calculation value Kgm×TGI to the subtracter s1.

As mentioned above, as the electric generator 16 is operated by the electric generator target torque TG*, the electric generator torque TG is generated and the ring gear torque TR is outputted from the ring gear R and is transmitted to the drive shaft 50. However, when the ring gear torque TR is changed as the electric generator rotating speed NG is changed, the changed ring gear torque TR is transmitted to the drive shaft 50 and the drive shaft torque becomes excessive or deficient with respect to the vehicle request torque TO*. Therefore, the output shaft torque TM/OUT becomes excessive or deficient with respect to the calculation value Kdm× TO*.

Therefore, the drive motor target torque calculating section 81 calculates the inertia correction torque Tam on the output shaft 26

$$\begin{aligned} Tam &= -Kgm \times TG^* - (-Kgm \times TGI) \\ &= -Kgm(TG^* - TGI) \\ &= -Kgm(TG^* - InG \times \alpha G) \end{aligned} \quad (3)$$

by subtracting (really adding a value subtracted by the subtracter s1) the calculation value −Kgm×TGI calculated on the basis of the inertia torque TGI from the calculation value −Kgm×TG* calculated on the basis of the electric generator target torque TG* in the adder a1. The drive motor target torque calculating section 81 also presumes this inertia correction torque Tam as the output shaft torque TM/OUT.

The drive motor target torque calculating section 81 then generates the excessive and deficient amounts of the output shaft torque TM/OUT with respect to the calculation value Kdm×TO* as the drive motor target torque TM* in the subtracter s2, and drives the drive motor 25 in accordance with this drive motor target torque TM*. When the engine rotating speed NE is constant, the inertia torque TGI normally has a negative value with respect to the accelerating direction during the acceleration of the hybrid vehicle, and has a positive value with respect to the accelerating direction during the deceleration of the hybrid vehicle.

However, as mentioned above, for example, the angular acceleration αG of the electric generator 16 is required to calculate the inertia torque TGI, but is influenced by a detecting error of the position sensor 39 for detecting the rotor position θG, etc., and is changed. Accordingly, the angular acceleration αG includes a disturbance component of a noise shape. The inertia torque TGI and the inertia correction torque Tam also include the disturbance component of the noise shape. Accordingly, the inertia correction torque Tam is used as the output shaft torque TM/OUT as it is. When the drive motor 25 is driven by drive motor target torque TM'* generated on the basis of the output shaft torque TM/OUT, vibration is generated in the hybrid vehicle.

Namely, as shown in FIG. 14, when the disturbance component of the noise shape is generated as an error amount ΔαG with respect to the angular acceleration αG, the excessive and deficient amounts of the actual output shaft torque TM/OUT are calculated as the inertia correction torque Tam. When the drive motor target torque TM'* is generated, the vehicle request torque TO* varies over an amplitude ε1 with respect to the vehicle output torque TO actually outputted from the hybrid vehicle, and the vibration of amplitude ε1 is generated in the hybrid vehicle. At this time, as the drive motor 25 is driven by the drive motor target torque TM'*, the drive motor rotating speed NM varies over an amplitude ε2 by following the inertia correction torque Tam and the drive motor target torque TM*. Thus, the angular acceleration αM varies on a delay with respect to the drive motor rotating speed NM.

Therefore, in this embodiment, the change of the output shaft torque TM/OUT is calculated on the basis of the behavior of the output shaft 26. In this case, for example, the change of the output shaft torque TM/OUT is calculated on the basis of the angular acceleration αM of the drive motor 25 connected to the drive shaft 50 through the differential device 36, the diff ring gear 35, the diff pinion gear 33, the counter shaft 30, the second counter driven gear 32, and the second counter drive gear 27.

The damping torque Tdm, in a direction for canceling the inertia InG, and the inertia torque TGI is applied to the drive motor 25 such that the angular acceleration αM becomes zero.

Therefore, the drive motor target torque calculating section 81 reads the angular acceleration αM of the drive motor 25 and sends this angular acceleration αM to the multiplier g5. In this multiplier g5, the angular acceleration αM is multiplied by the damping coefficient Km and the damping torque Tdm:

$$Tdm = Km \times \alpha M$$

is calculated and sent to the subtracter s1.

Subsequently, the drive motor target torque calculating section 81 subtracts the calculation value −Kgm×TGI from the damping torque Tdm in the subtracter s1, and sends the calculation value (Kgm×TGI+Tdm) through the limiter m1 to the adder a1 as the correction torque Tc. In this case, the damping torque Tdm is increased in proportion to the magnitude of the behavior of the output shaft 26.

Accordingly, the drive motor target torque calculating section 81 adds the calculation value −Kgm×TG* and the correction torque Tc in the adder a1, i.e., the inertia correction torque Tam and the damping torque Tdm, and calculates the output shaft torque TM/OUT:

$$TM/OUT = Tam + Tdm \quad (4)$$

-continued $$= -Kgm(TG^* - InG \times aG) + Km \times aM$$

and sends this output shaft torque TM/OUT to the subtracter s2.

Subsequently, the drive motor target torque calculating section 81 subtracts the output shaft torque TM/OUT from the calculation value Kdm×TO* in the subtracter s2, and can generate the drive motor target torque TM*:

$$TM^* = Kdm \times TO^*TM / OUT \quad (5)$$

$$= Kdm \times TO^* - \{-Kgm(TG^* - InG \times aG) + Km \times aM\}$$

$$= Kdm \times TO^* -$$

$$(Kgm \times InG \times aG + Km \times aM - Kgm \times TG^*).$$

The vehicle controller 51 (FIG. 6) then determines the calculated drive motor target torque TM*, and sends this drive motor target torque TM* to the drive motor controller 49.

The inertia torque TGI and the damping torque Tdm are calculated so as to always cancel each other. Accordingly, when upper and lower limits are set to the inertia torque TGI and the damping torque Tdm, the upper and lower limits are set after the correction torque Tc is calculated in the subtracter s1. Namely, these torques are limited after the calculation value −Kgm×TGI of the inertia torque TGI is subtracted from the calculation value of the damping torque Tdm.

Accordingly, it is possible to restrain the vibration generated in the hybrid vehicle by the error of the presumed output shaft torque TM/OUT, and electric power consumption due to the vibration component can be limited.

When the electric generator brake B is engaged, the electric generator target torque TG* is set to zero. Accordingly, the ring gear torque TR and the engine torque TE are in a proportional relation. Therefore, when the electric generator brake B is engaged, the drive motor target torque calculating section 81 reads the engine torque TE and calculates the ring gear torque TR on the basis of the engine torque TE according to the torque relation formula. The drive motor target torque calculating section 81 further presumes the output shaft torque TM/OUT on the basis of this ring gear torque TR and the ratio of the tooth number of the second counter drive gear 27 to the tooth number of the ring gear R.

Thus, the damping torque Tdm is generated so as to cancel the inertia torque TGI without using the inertia correction torque Tam as the output shaft torque TM/OUT as it is, and the output shaft torque TM/OUT is corrected. Accordingly, the excessive and deficient amounts of the output shaft torque TM/OUT can be reliably compensated for with respect to the calculation value Kdm×TO*, and the output shaft torque TM/OUT can be corrected. Accordingly, the generation of vibration in the hybrid vehicle can be limited.

Namely, as shown in FIG. 15, when the disturbance component of a noise shape is generated as an error amount ΔαG with respect to the angular acceleration αG, the excessive and deficient amounts of the actual output shaft torque TM/OUT are calculated as the inertia correction torque Tam, and the damping torque Tdm is also calculated. As its result, the drive motor target torque TM* having an amplitude smaller than that of the drive motor target torque TM'* using the inertia correction torque Tam as it is, is generated. The vehicle request torque TO* varies over a small amplitude ϵ3 (<ϵ1) with respect to the actual vehicle output torque TO, and the vibration of the amplitude ϵ3 is generated in the hybrid vehicle. At this time, as the drive motor 25 is driven by the drive motor target torque TM*, the drive motor rotating speed NM varies over a small amplitude ϵ4 (<ϵ2) by following the inertia correction torque Tam and the drive motor target torque TM*, and the angular acceleration αM varies on a delay with respect to this drive motor rotating speed NM. In this case, the error amount ΔαG of the angular acceleration αG and the angular acceleration αM vary so as to mutually cancel each other.

A second embodiment of the invention will next be explained.

Figure 16:
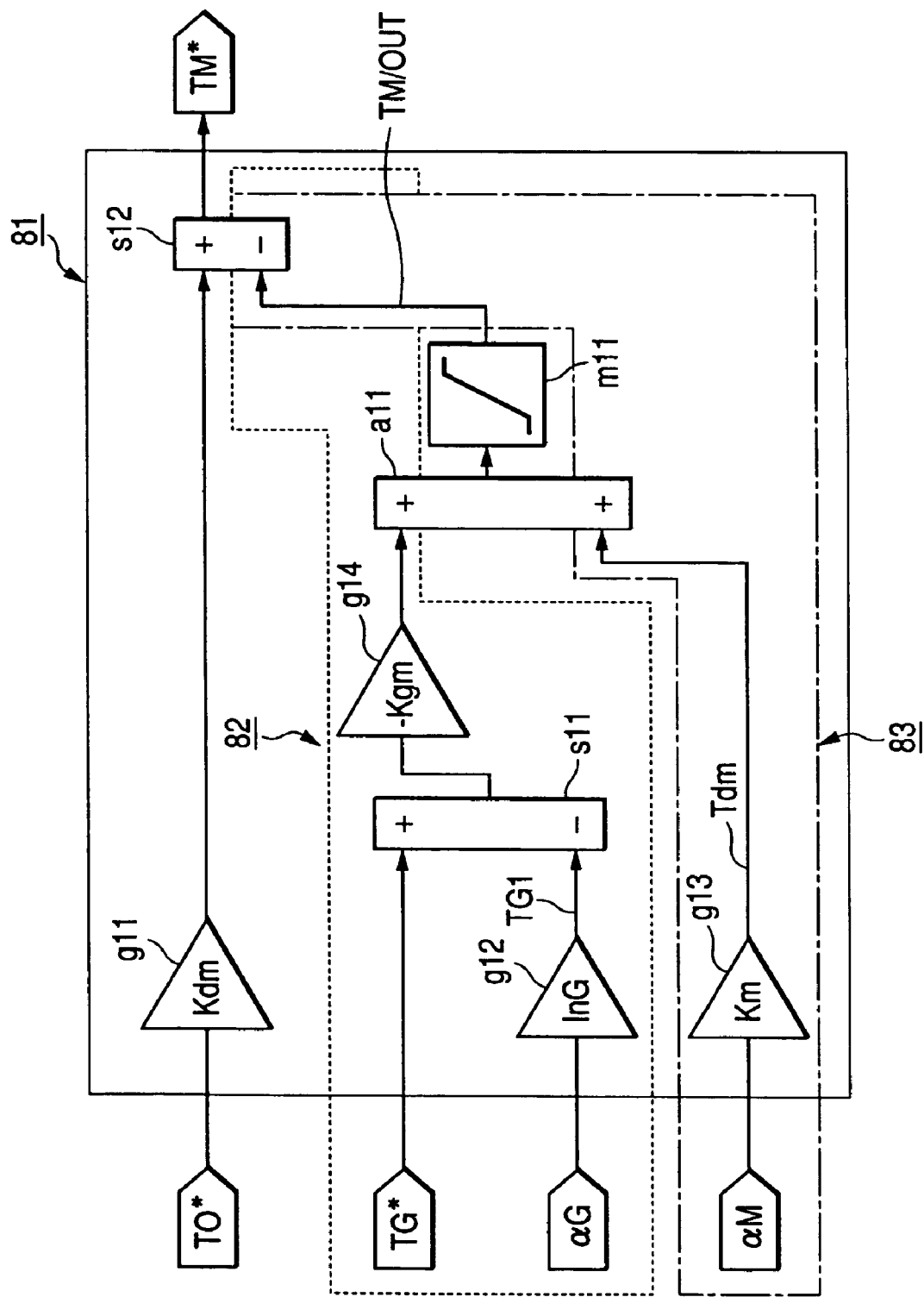
FIG. 16 is a view showing a drive motor target torque calculation processing section in a second embodiment of the invention.

FIG. 16 is a view showing a drive motor target torque calculation processing section of the second embodiment of the Invention.

In this figure, reference numeral 81 designates a drive motor target torque calculating section as a drive motor target torque calculation processing means. Reference numerals g11 to g14 designate multipliers, and reference numerals s11 and s12 designate subtracters. Reference numerals m11 and a11 respectively designate a limiter and an adder. Reference numeral 82 designates an inertia correction processing section as an inertia correction processing means. This inertia correction processing section 82 has multipliers g12 and g14, the subtracters s1 and s12 and the adder a11. Reference numeral 83 designates a damping torque correction processing section as a damping torque correction processing means. This damping torque correction processing section 83 has the multiplier g13, the subtracter s12, and the adder a11.

A correction torque calculation processing means includes the subtracter s11. The subtracter s11 performs correction torque calculation processing, and calculates the correction torque Tc. A drive motor target torque generation processing means includes the subtracter s12. The subtracter s12 performs drive motor target torque generation processing, and generates the drive motor target torque TM*.

An inertia torque calculation processing means includes the multiplier g12. The multiplier g12 performs inertia torque calculation processing, and calculates the inertia torque TGI. Further, an inertia correction torque calculation processing means and an output torque presumption processing means include the adder a11. The adder a11 performs the inertia correction torque calculation processing and output torque presumption processing, and calculates the inertia correction torque Tam, and presumes the output shaft torque TM/OUT. A damping torque calculation processing means includes the multiplier g13. The multiplier g13 performs damping torque calculation processing, and calculates the damping torque Tdm. Further, a torque limit processing means includes the limiter m11. The limiter m11 performs torque limit processing, and limits the output shaft torque TM/OUT outputted from the adder a11.

When the vehicle request torque TO* is determined, the drive motor target torque calculating section 81 of the construction reads the vehicle request torque TO* and sends this vehicle request torque TO* to the multiplier g11. In this multiplier g11, the vehicle request torque TO* is multiplied by the gear ratio Kdm, and is converted into the calculation value Kdm×TO* of the output shaft 26 (FIG. 2) and this calculation value Kdm×TO* is sent to the subtracter s12.

Further, the drive motor target torque calculating section 81 reads the electric generator target torque TG* and sends this electric generator target torque TG* to the subtracter s11. The drive motor target torque calculating section 81 also reads the angular acceleration αG of the electric generator 16 and sends this angular acceleration αG to the multiplier g12.

In this multiplier g12, the angular acceleration αG is multiplied by the inertia InG of the electric generator 16, and the inertia torque TGI:

$$TGI = InG \times \alpha G$$

is calculated and sent to the subtracter s11.

The drive motor target torque calculating section 81 then subtracts the inertia torque TGI from the electric generator target torque TG* in the subtracter s11, and calculates inertia correction torque Tam':

$$\begin{aligned} Tam' &= TG^* - TGI \\ &= TG^* - InG \times \alpha G \end{aligned} \quad (6)$$

and sends this inertia correction torque Tam' to the multiplier g14.

Further, the drive motor target torque calculating section 81 multiplies the inertia correction torque Tam' by the gear ratio −Kgm in the multiplier g14, and converts the inertia correction torque Tam' into the calculation value −Kgm×Tam' on the output shaft 26, and presumes this calculation value −Kgm×Tam' as the output shaft torque TM/OUT.

However, as mentioned above, the angular acceleration αG includes the disturbance component of a noise shape, and the inertia torque TGI also includes the disturbance component of the noise shape. Accordingly, when the drive motor 25 is driven by the drive motor target torque TM* calculated on the basis of the inertia torque TGI, vibration is generated in the hybrid vehicle.

Therefore, the drive motor target torque calculating section 81 reads the angular acceleration aM of the drive motor 25, and sends this angular acceleration αM to the multiplier g13. In this multiplier g13, the angular acceleration αM is multiplied by a damping coefficient Km as an output torque changing index, and the damping torque Tdm:

$$Tdm = Km \times \alpha M$$

is calculated and sent to the adder a11. Subsequently, the drive motor target torque calculating section 81 adds the damping torque Tdm to the calculation value −Kgm×Tam' in the adder a11, and calculates the output shaft torque TM/OUT:

$$\begin{aligned} TM/OUT &= -Kgm \times Tam' + Tdm \\ &= -Kgm(TG^* - InG \times \alpha G) + Km \times \alpha M \end{aligned} \quad (7)$$

and sends this output shaft torque TM/OUT to the subtracter s12 through the limiter m11.

Subsequently, the drive motor target torque calculating section 81 subtracts the output shaft torque TM/OUT from the calculation value Kdm×TO* in the subtracter s12, and can generate the following drive motor target torque TM*:

$$\begin{aligned} TM^* &= Kdm \times TO^* - TM/OUT \\ &= Kdm \times TO^* - \{-Kgm(TG^* - InG \times \alpha G) + Km \times \alpha M\} \\ &= Kdm \times TO^* - \\ &\quad (Kgm \times InG \times \alpha G + Km \times \alpha M - Kgm \times TG^*) \end{aligned} \quad (8)$$

The vehicle controller 51 (FIG. 6) determines the calculated drive motor target torque TM* and sends this drive motor target torque TM* to the drive motor controller 49.

In each of the embodiments, the damping torque Tdm is calculated by multiplying the angular acceleration αM by the damping coefficient Km as a correction coefficient. However, instead of the damping coefficient Km, inertia InM of the drive motor 25 can be used as the correction coefficient, and the damping torque Tdm:

$$Tdm = InM \times \alpha M$$

can be also calculated by multiplying the angular acceleration αM by this inertia InM.

Although exemplary embodiments of the present invention have been described, it will be understood by one of skill in the art that the present invention is not limited to the described embodiments, but can be variously modified within the spirit and scope of the invention.

What is claimed is:

1. An electrically operated vehicle drive controller of a vehicle drive unit, which comprises a differential rotating device having first, second and third differential elements, and the first differential element is mechanically connected to the electric generator, and the second differential element is mechanically connected to a drive motor and to a drive wheel, and the third differential element is mechanically connected to an engine, comprising:

electric generator target torque calculation processing means for calculating a target value of electric generator torque;

inertia correction torque calculation processing means for calculating inertia correction torque on the basis of the calculated electric generator target torque or the electric generator torque corresponding to the calculated electric generator target torque, and an inertia torque of an electric generator corresponding to an angular acceleration of the electric generator;

drive motor target torque calculation processing means for calculating a target value of drive motor torque on the basis of the calculated inertia correction torque and a vehicle request torque; and damping torque correction processing means for correcting the target value of the drive motor torque on the basis of an angular acceleration of the drive motor which expresses a change of output torque due to the calculated inertia correction torque.

2. The electrically operated vehicle drive controller according to claim 1, wherein:

the inertia torque is calculated on the basis of the angular acceleration of the electric generator and inertia of the electric generator.

3. The electrically operated vehicle drive controller according to claim 1, wherein:

the damping torque correction processing means calculates a damping torque on the basis of the angular acceleration of the drive motor and a predetermined correction coefficient, and corrects the output torque on the basis of the damping torque.

4. The electrically operated vehicle drive controller according to claim 1, wherein:

the damping torque correction processing means corrects the target value of drive motor torque so as to set the angular acceleration of a drive motor to zero.

5. The electrically operated vehicle drive controller according to claim 1, wherein the inertia correction processing means calculates inertia correction torque by multiplying the angular acceleration of the electric generator by the inertia of the electric generator, and the damping torque correction processing means calculates a damping torque by multiplying the angular acceleration of a drive motor by the inertia of the drive motor.

6. The electrically operated vehicle drive controller according to claim 1, wherein the electrically operated vehicle drive controller further comprises a rotating speed of the electric generator is controlled to set an engine torque to an engine target torque, and the drive motor torque is controlled to set a drive shaft torque outputted to a drive shaft to a vehicle request torque required to run the electrically operated vehicle.

7. The electrically operated vehicle drive controller according to claim 3, wherein:

the predetermined correction coefficient is a predetermined damping coefficient.

8. The electrically operated vehicle drive controller according to claim 3, wherein:

the predetermined correction coefficient is an inertia of a drive motor.

9. The electrically operated vehicle drive controller according to claim 4, wherein:

the inertia correction torque calculation processing means subtracts a calculation value of the inertia torque of the electric generator from a calculation value of the damping torque, and the drive motor target torque calculation processing means comprises a limiter for limiting the torque.

10. The electrically operated vehicle drive controller according to claim 9, wherein:

said drive motor target torque is calculated by adding the damping torque to a calculation value calculated by subtracting the inertia correction torque from a vehicle request torque.

11. An electrically operated vehicle drive control method comprising:

calculating an electric generator target torque which is a target value of electric generator torque;

calculating an inertia correction torque on the basis of the electric generator target torque and an inertia torque of an electric generator, or on the basis of an electric generator torque corresponding to the electric generator target torque and an inertia torque of an electric generator corresponding to an angular acceleration of the electric generator;

calculating a drive motor target torque, which is a target value of a drive motor torque, on the basis of the calculated inertia correction torque and a vehicle request torque; and correcting the target value of the drive motor torque on the basis of an angular acceleration of the drive motor which expresses a change of an output torque due to the calculated inertia correction torque.

* * * * *